(12) United States Patent
Adogla

(10) Patent No.: US 8,961,315 B1
(45) Date of Patent: Feb. 24, 2015

(54) PROVIDING TASKS TO USERS DURING ELECTRONIC GAME PLAY

(75) Inventor: Eden G. Adogla, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 861 days.

(21) Appl. No.: 13/171,129

(22) Filed: Jun. 28, 2011

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |

(52) U.S. Cl.
USPC ............... 463/42; 463/20; 463/25; 463/29; 463/40; 463/41

(58) Field of Classification Search
USPC ............... 463/20, 25, 29, 40, 41, 42
See application file for complete search history.

(56) References Cited

U.S. PATENT DOCUMENTS

| | | | |
|---|---|---|---|
| 5,455,875 A | 10/1995 | Chevion et al. | 382/311 |
| 5,465,308 A | 11/1995 | Hutcheson et al. | 382/159 |
| 5,805,745 A | 9/1998 | Graf | 382/291 |
| 5,826,244 A | 10/1998 | Huberman | 705/37 |
| 5,848,393 A | 12/1998 | Goodridge et al. | 705/8 |
| 5,862,223 A | 1/1999 | Walker et al. | 380/25 |
| 5,937,388 A | 8/1999 | Davis et al. | 705/8 |
| 6,012,066 A | 1/2000 | Discount et al. | 707/103 |
| 6,032,151 A | 2/2000 | Arnold et al. | 707/103 |
| 6,041,306 A | 3/2000 | Du et al. | 705/8 |
| 6,044,355 A | 3/2000 | Crockett et al. | 705/8 |
| 6,078,916 A | 6/2000 | Culliss | 707/5 |
| 6,112,243 A | 8/2000 | Downs et al. | 709/226 |
| 6,128,380 A | 10/2000 | Shaffer et al. | 379/265 |
| 6,163,607 A | 12/2000 | Bogart et al. | 379/266 |
| 6,173,053 B1 | 1/2001 | Bogart et al. | 379/266 |
| 6,181,343 B1 | 1/2001 | Lyons | 345/358 |
| 6,182,068 B1 | 1/2001 | Culliss | 707/5 |
| 6,223,165 B1 | 4/2001 | Lauffer | 705/8 |
| 6,385,620 B1 | 5/2002 | Kurzius et al. | 707/104.1 |
| 6,393,497 B1 | 5/2002 | Arnold et al. | 709/330 |
| 6,539,377 B1 | 3/2003 | Culliss | 707/5 |
| 6,546,087 B2 | 4/2003 | Shaffer et al. | 379/90.01 |
| 6,584,192 B1 | 6/2003 | Agusta | 379/265.12 |
| 6,584,464 B1 | 6/2003 | Warthen | 707/4 |
| 6,587,556 B1 | 7/2003 | Judkins et al. | 379/219 |
| 6,603,854 B1 | 8/2003 | Judkins et al. | 379/265.06 |

(Continued)

OTHER PUBLICATIONS

U.S. Appl. No. 10/990,771, filed Nov. 16, 2004, Mortensen et al.

(Continued)

*Primary Examiner* — Adetokunbo O Torimiro
(74) *Attorney, Agent, or Firm* — Seed IP Law Group PLLC

(57) ABSTRACT

Techniques are described for facilitating performance of tasks by users in a computer game environment. In some situations, the techniques include automated operations of a system that receives multiple tasks from a task fulfillment system, provides the multiple tasks to multiple users as part of playing an electronic game, receives results of performance of the tasks by the users as part of the game playing, sends the task performance results to the task fulfillment system, receives and retains monetary compensation for the performance of the tasks, and provides non-monetary virtual rewards to the multiple users for the performance of the provided multiple tasks. The non-monetary virtual rewards may be rewards that are part of the electronic game and are usable by the multiple users as part of the playing of the electronic game.

27 Claims, 10 Drawing Sheets

(56) References Cited

U.S. PATENT DOCUMENTS

| | | | | |
|---|---|---|---|---|
| 6,636,590 | B1 | 10/2003 | Jacob et al. | 379/114.05 |
| 6,704,403 | B2 | 3/2004 | Lurie et al. | 379/114.1 |
| 6,707,904 | B1 | 3/2004 | Judkins et al. | 379/265.06 |
| 6,742,002 | B2 | 5/2004 | Arrowood | 707/104.1 |
| 6,763,104 | B1 | 7/2004 | Judkins et al. | 379/265 |
| 6,859,523 | B1 | 2/2005 | Jilk et al. | 379/32.01 |
| 6,938,048 | B1 | 8/2005 | Jilk et al. | 707/102 |
| 7,155,400 | B1 | 12/2006 | Jilk et al. | 705/9 |
| 7,197,459 | B1* | 3/2007 | Harinarayan et al. | 704/270.1 |
| 7,945,469 | B2 | 5/2011 | Cohen et al. | 705/9 |
| 7,945,470 | B1 | 5/2011 | Cohen et al. | 705/9 |
| 2001/0042000 | A1 | 11/2001 | Defoor, Jr. | 705/9 |
| 2002/0069079 | A1 | 6/2002 | Vega | 705/1 |
| 2002/0083079 | A1 | 6/2002 | Meier et al. | 707/104.1 |
| 2003/0078852 | A1 | 4/2003 | Shoen et al. | 705/26 |
| 2003/0120559 | A1 | 6/2003 | Don | 705/26 |
| 2003/0200156 | A1 | 10/2003 | Roseman et al. | 705/27 |
| 2003/0204449 | A1 | 10/2003 | Kotas et al. | 705/27 |
| 2005/0229104 | A1 | 10/2005 | Franco et al. | 715/743 |
| 2006/0106774 | A1 | 5/2006 | Cohen et al. | 707/3 |
| 2008/0082542 | A1 | 4/2008 | Cohen et al. | 707/10 |
| 2008/0139317 | A1* | 6/2008 | Sheikh | 463/42 |
| 2009/0054127 | A1* | 2/2009 | Sweary et al. | 463/16 |

OTHER PUBLICATIONS

U.S. Appl. No. 10/991,339, filed Nov. 16, 2004, Cohen et al.
U.S. Appl. No. 12/966,873, filed Dec. 13, 2010, Amacker.
"About Spending," retrieved Nov. 23, 2004, from http://www.mypoints.com/mp/dstatial.show?isref=nmhp.popup.aboutspending.default, 1 page.
"Earning Points with MyPoints," retrieved Nov. 23, 2004, from http://www.mypoints.com/mp/dstatial.show?isref=nmhp.popup.aboutearning.default, 1 page.
"FAQs," retrieved Nov. 23, 2004, from http://www.mypoints.com/mp/dstatial.show?isref=nmhp.popup.faq.default, 1 page.
"Frequently Asked Questions about the Open Mind Initiative," retrieved Nov. 16, 2004, from http://www.openmind.org/FAQs.html, 3 pages.
"Frequently Asked Questions," TrueDater FAQ's, retrieved Apr. 4, 2005, from http://www.truedater.com/index.php?action=faqs, 2 pages.
"Grid—The Competitive Advantage," Aug. 2004, retrieved Jun. 9, 2005, from http://www.sun.com/solutions/documents/articles/grid_adv_aa.xml?null, 2 pages.
"Join MyPoints Now," retrieved Nov. 23, 2004, from http://www.mypoints.com/?MCK=ccb67d8c41a3819b, 4 pages.
"Payment-On-Line (AOL, Compuserve, Internet, etc)," Oct. 20, 1994, retrieved Dec. 6, 2004, from http://groups-beta.google.com/group/misc.entrepreneurs/browse_thread/thread/80fcf110252bb3f7/ff1c8, 3 pages.
"The ESP Game," retrieved Jun. 8, 2005, from http://www.espgame.org, 1 page.
"What is BonusMail®?," retrieved Nov. 23, 2004, from http://www.mypoints.com/mp/dstatial.show?isref=nmhp.popup.bonusmail.default, 1 page.
"What is Keen," retrieved Jun. 8, 2005, from http://www.keen.com/documents/homepage/wik_pop.asp?TID=gbFQnFLPstnUuFonMtBmHw, 1 page.
"What is MyPoints," retrieved Nov. 23, 2004, from http://www.mypoints.com/mp/dstatial.show?isref=nmhp.popup.whatis.default, 1 page.
About, Inc., "Intelligent Agents," retrieved Jun. 9, 2005, from http://psychology.about.com./od/intelligentagents/, 5 pages.
About, Inc., "Our Story," retrieved Jun. 9, 2005, from http://ourstory.about.com/, 2 pages.
About, Inc., Welcome to About.com, retrieved Jun. 9, 2005, from http://www.about.com, 2 pages.
Applied Skills & Knowledge, LLC, "Make Skills-Based Routing Happen," Jun. 3, 2003, retrieved from http://www.appliedskills.com/whitepapers/files/Skills-basedRouting.pdf, 3 pages.
Barlas, D., "Hipbone Connects to Kana," Jan. 5, 2004, retrieved Jun. 8, 2005, from http://www.line56.com/print/default.asp?ArticleID=5255, 1 page.
Calishain, T., "Yahoo! Service Offers More Advice than Expertise," May 6, 2002, retrieved Jul. 16, 2004, from http://www.infotoday.com/newsbreaks/nb020506-1.htm, 2 pages.
distributed.net, "distributed.net History & Timeline," retrieved Jun. 8, 2005, from http://www.distributed.net/history.php, 7 pages.
distributed.net, "The Organization," retrieved Jun. 8, 2005, from http://www.distributed.net/, 2 pages.
Doan, A., "MongoMusic Fans Include Microsoft," Sep. 9, 2000, Forbes.com, retrieved Jun. 9, 2005, from http://www.forbes.com/2000/09/09/feat2.html, 3 pages.
DuBaud, S., "Advice Site Resort to Legal Counsel," Jan. 4, 2002, retrieved Apr. 29, 2004, from http://news.com.com/2011-1088-801359.html, 3 pages.
Elance Inc., Elance *Online*™—Everyday Outsourcing™, retrieved Jun. 9, 2005, from http://www.elance.com/c/static/main/displayhtml.pl?file=eol.html&module=home, 2 pages.
Elance, Inc., "Elance History," retrieved Jun. 8, 2005, from http://www.elance.com/c/static/main/displayhtml.pl?file=heritage.html, 3 pages.
eLancer homepage, retrieved Jun. 8, 2005, from http://www.elancer.us/, 2 pages.
Epinions, Inc., Epinions.com homepage, retrieved Jun. 9, 2005, from http://www.epinions.com, 2 pages.
Fox, S., "Can New Technology Revolutionize the Net?," Jun. 1, 2000, CNET.com, retrieved Jun. 8, 2005, from http://web.archive.org/web/20001018221958/www.cnet.com/insider/0-121949-7-1995365.html, pp. 1-3, 3 pages.
Get a Freelancer.com homepage, retrieved Jun. 8, 2005, from http://www.getafreelancer.com, 3 pages.
gonesilent.com homepage, Aug. 22, 2000, retrieved Jun. 8, 2005, from http://web.archive.org/web/20000822122731/www.gonesilent.com/about.html, 2 pages.
Google—Answers, "Ask a question, Set your Price. Get your Answer.," retrieved Jun. 9, 2005, from http://answers.google.com/answers/, 1 page.
Google, "Your Computer's Idle Time is too Precious to Waste," retrieved Jun. 9, 2005, from http://toolbar.google.com/dc/offerdc.html, 1 page.
Gunn, S., "Hey, buddy, can you spare some cycles?," Sep. 24, 1997, retrieved Jun. 8, 2005, from http://www.cnn.com/TECH/9709/24/netly.news/, 4 pages.
Hagel, J. et al., "Go Slowly with Web Services," Feb. 15, 2002, CIO.com retrieved from http://www.cio.com/archive/021502/keynote.html, 4 pages.
Hagel, J., et al., "Your Next IT Strategy," *Harvard Business Review R0109G*:105-113, Oct. 2001, 11 pages.
Hagel, J., *Out of the Box—Strategies for Achieving Profits today and Growth Through Web Services*, Harvard Business School Publishing, Boston, Massachusetts, 2002, Front Cover through Acknowledgements, Chapter 1, "Responding to Unmet Needs," and Chapter 2, "Web Services Create New Options," pp. i-xix and 1-42, 33 pages.
Ingenio, Inc., Ingenio™ homepage, retrieved Jun. 8, 2005, from http://www.ingenio.com/default.asp?TF=1, 2 pages.
Ingenio, Inc., Introducing Ingenio™ Pay Per Call™, retrieved Jun. 8, 2005, from http://www.ingenio.com/documents/corp/home.asp, 2 pages.
Ingenio, Inc., KEEN—Your Personal Advisor, retrieved Jun. 8, 2005, from http://www.keen.com, 2 pages.
Ingenio, Inc., KEEN—Your Personal Advisor/Get Advice, retrieved Jun. 8, 2005, from http://www.keen.com/categories/get_answers.asp?SRCHT=0&search=&gid=0, 1 page.
Jupitermedia Corporation, "About jGuru.com: Overview," retrieved Jun. 9, 2005, from http://www.jguru.com/misc/about-overview.jsp, 2 pages.
Jupitermedia Corportion, jGuru homepage, retrieved Jun. 9, 2005, from http://www.jguru.com, 5 pages.
KANA Inc., "Corporate Overview," retrieved Jun. 8, 2005, from http://www.kana.com/about/about.aspx, 2 pages.

(56) References Cited

OTHER PUBLICATIONS

Katz, J., et al., "The Benefits of a Virtual Contact Center," MCI, Inc., May 2004, retrieved from http://global.mci.com/us/enterprise/insight/whitepapers/pdf/VirtualContactCtr.pdf, 7 pages.
Kenexa, "Call Centers," retrieved Jun. 8, 2005, from http://www.kenexa.com/ind_callcent.html, 3 pages.
Lynn, R., "Keeping Online Daters Honest," Apr. 1, 2005, retrieved on Apr. 4, 2005, from http://www.wired.com/news/print/0,1294,67083,00.html, 3 pages.
Massive Multiplayer Online Role-Playing Game—homepage, retrieved Jun. 8, 2005, from http://www.mpog.com, 2 pages.
Microsoft Corporation, "Microsoft Acquires MongoMusic," Sep. 13, 2000, retrieved Jun. 9, 2005, from http://www.microsoft.com/presspass/press/2000/sept00/mongopr.mspx, 2 pages.
Mori, G., et al., "Breaking a Visual CAPTCHA," retrieved Jun. 8, 2005, from http://www.cs.berkeley.edu/~mori/gimpy/gimpy.html, 4 pages.
Mossberg, W., "GuruNet as a Reference Tool Goes Beyond Search Engines," Mar. 6, 2003, retrieved Jul. 20, 2004, from http://ptech.wsj.com/archive/ptech-20030306.html, 3 pages.
Multiplayer Online Games Directory—homepage, retrieved Jun. 8, 2005, from http://www.mpogd.com, 1 page.
Nortel Networks, "Beyond ACD—The advantages of Skill-based Routing in Today's Contact Centers," Mar. 7, 2003, retrieved from http://www.nortelnetworks.com/solutions/ccvp/collateral/nn103640-030703.pdf, 12 pages.
Online Multiplayer Games Network—homepage, retrieved Jun. 8, 2005, from http://www.omgn.com, 2 pages.
Project Gutenberg's Distributed Proofreaders—homepage, retrieved Jun. 9, 2005 from http://www.pgdp.net/c/default.php, 4 pages.
Rhodes, B., "The Wearable Remembrance Agent: A System for Augmented Memory," Appeared in *Personal Technologies Journal Special Issue on Wearable Computing 1*:218-224, 1997, retrieved Jun. 9, 2005, from http://www.bradleyrhodes.com/Papers/wear-ra-personaltech/, 10 pages.
SERENA Software, Inc., "Serena™ Automating Change," retrieved Jun. 9, 2005, from http://www.serena.com, 1 page.
SETI Institute homepage, retrieved Jun. 9, 2005, from http://www.seti.org/site/pp.asp?c=ktJ2J9MMIsE&b=178025, 3 pages.
Siebel Systems, Inc., Siebel homepage, retrieved Jun. 8, 2005, from http://www.siebel.com/, 3 pages.
Singh, P., "OPEN MIND: common sense—Teaching computers the stuff we all know," retrieved Jun. 9, 2005, from http://commonsense.media.mitedu/cgi-bin/search.cgi, 2 pages.
Singh, P., "The Open Mind Common Sense Project," Jan. 2, 2002, retrieved Jun. 9, 2005, from http://www.kurzweilai.net/articles/art0371.html, pp. 1-24, 24 pages.
Spice, B., "CMU Student Taps Brain's Game Skills," Oct. 5, 2003, retrieved Jun. 8, 2005, from http://www.post-gazette.com/pg/03278/228349.stm, 5 pages.
Spogg.com—homepage, retrieved Jun. 8, 2005, from http://www.spogg.com, 2 pages.
Sun Microsystems, Inc., "Products & Technologies—Java Technology," retrieved Jun. 9, 2005, from http://java.sun.com, 2 pages.
Sun Microsystems, Inc., "The Jini Technology Series: JavaSpaces Principles, Patterns, and Practice," retrieved Jun. 9, 2005, from http://java.sun.com/docs/books/jini/javaspaces/, 2 pages.
TopCoder, Inc., TOPCODER homepage, retrieved Jun. 8, 2005, from http://www.topcoder.com/, 2 pages.
University of California, "What is SETI@home?," retrieved Jun. 9, 2005, from http://setiathome.ssl.berkeley.edu./, 1 page.
Wilson, B. "Anti-Social Software, "Apr. 30, 2004, retrieved Aug. 26, 2005, from http://www.brendonwilson.com/profile/000156.shtml, 5 pages.
Wolverton, T., et al., "Yahoo Launches Advice Site," Apr. 29, 2002, CNET News.com, retrieved Apr. 29, 2004, from http://news.com.com/2102-1017_3-894968.html?tag+st.util.print, 2 pages.

\* cited by examiner

PROVIDING TASKS TO USERS DURING ELECTRONIC GAME PLAY

BACKGROUND

The widespread popularity of the World Wide Web ("Web") has provided numerous opportunities for computers to inter-communicate. For example, there is growing use of the Web to provide so-called "Web services," which typically involve the programmatic interaction of remote applications to exchange information via defined APIs ("application program interfaces"), or the like. At the same time, there is a very large class of tasks which computers and application programs cannot easily automatically perform, but which humans can typically easily perform, referred to herein as "human performance tasks." This is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

DETAILED DESCRIPTION

Techniques are described for facilitating the performance of tasks by human users, with the tasks in some embodiments being provided by task providers who submit tasks that are available to be performed to an automated task fulfillment system. The task providers may compensate the humans that perform the tasks. For example, a task provider may provide specified monetary compensation to other humans who perform the tasks.

In at least some embodiments, at least some of the tasks are performed by users who are playing electronic games. For example, a game service can insert the tasks into an electronic game, such as to be performed by a user as part of the electronic game—the game service may, for example, provide one or more electronic games to end users and/or provide a gaming-related service that supplies in-game functionality or related functionality to users who are playing one or more electronic games (whether games provided by the game service or by another entity). In a specific example, if the electronic game includes interactive content that is provided by one or more configured computing systems of the game service, those computing system(s) may electronically interact with the task fulfillment system to obtain information about tasks that are available to be performed, and then dynamically add particular tasks to the interactive content that is provided to particular users playing the electronic game. In at least some such embodiments, after tasks are performed by users of such an electronic game, the game service may receive and retain at least some of the specified monetary compensation associated with those tasks, while providing one or more types of virtual non-monetary rewards within the electronic game to the game users who perform the tasks. Additional details related to automated operations of configured computing systems of such game services to perform some or all of the described techniques are included below.

Figure 1:
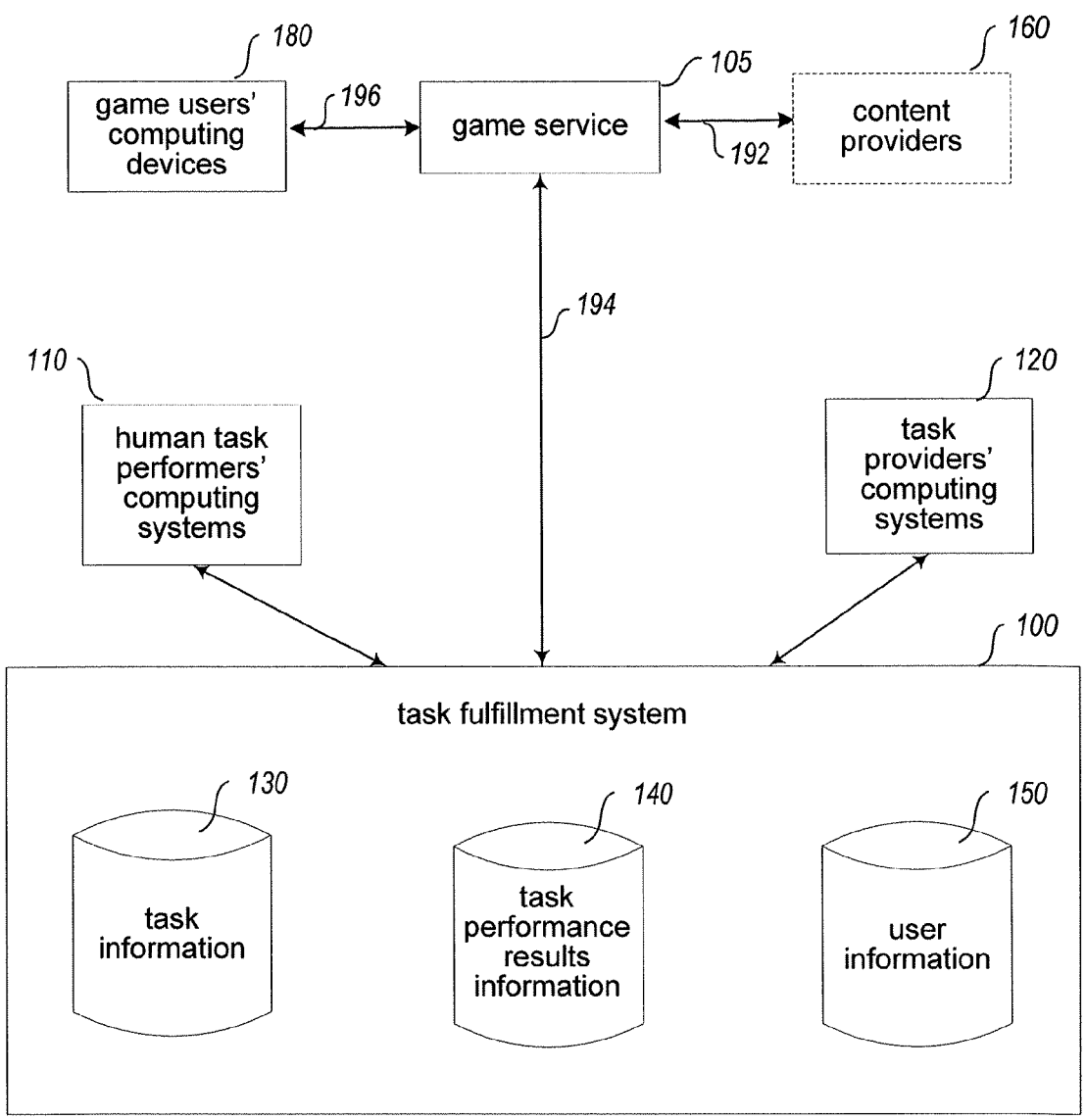
FIG. 1 is a block diagram illustrating an example embodiment of an environment in which tasks are performed by users of electronic games.

FIG. 1 is a block diagram illustrating an example embodiment of an environment in which tasks are performed by users of electronic games. In this example, a task fulfillment system 100 provides functionality related to human performance of tasks, such as by managing data related to tasks and to users who supply and/or perform the tasks. In addition, a game service system 105 provides interactive content to game users using computing devices 180, such as, for example, by providing online computer games or other electronic games, and/or by providing functionality that is part of playing one or more electronic games (whether for electronic games provided by the game service system or from one or more other sources). For illustrative purposes, some embodiments are described herein in which specific types of users and systems interact in specific ways, and in which the systems store specific types of data and provide specific types of related functionality. However, it will be understood that the invention is not limited to these illustrative examples.

In the illustrated embodiment of FIG. 1, the game service system 105 programmatically interacts with the task fulfillment system to coordinate the performance of tasks, including by obtaining task information from the task fulfillment system and providing results of in-game task performance to the task fulfillment system. In other embodiments, a single game service system may interact with multiple task fulfillment systems and/or a single task fulfillment system may interact with multiple game service systems. It should also be understood, that a single entity may operate both systems 100 and 105 in some embodiments, while different entities may operate systems 100 and 105 in other embodiments.

The task fulfillment system 100 may be implemented in various manners in various embodiments, such as in the form of a software system executing on one or more programmed or otherwise configured computing systems or devices (e.g., in a distributed manner, such as on a peer-to-peer or grid network), although such computing systems or devices are not shown in this example. In addition, the types of tasks to be performed may have various forms in various embodiments. For example, as discussed below, there is a large class of tasks which computers and application programs cannot easily automatically perform, but which humans can typically easily perform, and some or all of the tasks may be of this form.

In at least some embodiments, the task fulfillment system 100 may facilitate the submission and performance of such tasks, including tasks submitted by task providers via their computing systems 120, or alternatively obtained in other manners (e.g., by the task fulfillment system 100, by the game service system 105, etc.). In addition, various human task performer users may use their computing systems 110 to interact with the task fulfillment system are perform various submitted tasks. In the example of FIG. 1, the task fulfillment system 100 includes a task information data repository 130, task performance results information data repository 140, and a user information data repository 150.

The task fulfillment system 100 may provide various functionality related to the performance of tasks by task performer users 110. For example, when a task performer user requests information about available tasks (e.g., as part of a search or browse request), the task fulfillment system 100 provides task-related data obtained from the task information data repository 130. In addition, when a task performer user requests to perform (or is assigned for performance) a particular task, the task fulfillment system 100 stores a temporary association between the task performer user and the task (e.g., in the task performance results information data repository 140). Then, when the task performer user has completed performance of the task, such as by providing task results for the performed task to the task fulfillment system 100, the task fulfillment system 100 stores the task results in the task performance results information data repository 140. The task fulfillment system 100 may also perform other related functions, such as notifying a task provider of the task results and/or completion of the performed task, facilitating providing monetary compensation to users 110 for performing the task, etc.

The task fulfillment system 100 may enable the management of various users, such as users associated with task providers 120 and task performer users 110. For example, such users may register with the task fulfillment system 100 by providing identifying information (e.g., name, address, telephone number(s), email addresses, etc.), possibly accompanied by various user preference information and/or payment information that may be used to facilitate payments between task providers and task performer users for the performance of tasks. Such user-related information may be stored by the task fulfillment system 100 in the user information data repository 150, and the task fulfillment system 100 may further in some embodiments store various user-related information in the repository 150 (e.g., information about previous interactions between the system and the user, such as to reflect aggregate information about previous task performance for task performer users). In addition, task performer users 110 may also in at least some embodiments obtain qualifications that may be utilized for purposes of matching task performer users with appropriate tasks, with such qualification information also being stored in the user information data repository 150.

The game service system 105 may be implemented in various manners in various embodiments, such as in the form of a software system executing on one or more programmed or otherwise configured computing systems or devices (not shown). In particular, the game service system 105 may optionally receive information from one or more third-party content providers 160, including to perform automated programmatic interactions 192 over one or more intervening networks (not shown) with computing systems (not shown) that serve those content providers in order to obtain content instances (e.g., electronic games; functionality corresponding to games, such as information to be displayed as part of games or within games, to enable interactions with other users of the game; etc.) to be made available to users. The game service system 105 may also perform automated programmatic interactions 194 over one or more intervening networks (not shown) with the task fulfillment system 100 in order to obtain information about one or more tasks that are available to be performed, for use in providing to users as part of provided electronic games or other provided interactive content.

After the game service system 105 receives available tasks from the task fulfillment system, the game service provides the tasks to devices 180 of various game users via interactions 196, whether as part of electronic games being provided to game-playing devices of the users, or as part of functionality being provided for electronic games that are already present on the game-playing devices. The tasks are then presented to the game users as part of playing an electronic game, such as in a manner designed by a creator of the game to incorporate the performance of such tasks, or instead by being added to other information that is provided to the game users by the game service system 105. As one example, a menu may be available to be accessed by a user playing a game, and the user can view one or more tasks via that menu. In a specific example, the menu could be accessed in-game (e.g., while the game is being played). In the same, or another embodiment, the menu could be accessed in a main screen that is rendered before the game is started. In the same, or another embodiment, the tasks can be accessed by interacting with an in-game item such as a bulletin board. In the same, or another embodiment, tasks can be obtained during the game by interacting with other characters that are playing the game with the user and/or by interacting with non-playing characters (e.g., entities that are not controlled by other users playing the game, such as quest givers in massively multiplayer online games). After a game user performs one or more such supplied tasks as part of playing the electronic game, the results of the task performance may be supplied back to the task fulfillment system 100 in various manners, such as via the game service system or instead being sent directly to the task fulfillment system from the game-playing devices.

As previously noted, when a task provider supplies information defining one or more tasks, the task fulfillment system 100 may store the task-related data in the task information data repository 130, which may then be made available to task performer users 110 (or to a performance intermediary such as the game service system 105) to perform those tasks in a manner specified by the task provider, or as otherwise determined by the task fulfillment system 100. The supplied information for a task may include a variety of types of information, including one or more pieces of data to be reviewed (e.g., one or more Web pages or portions thereof), other details related to the task (e.g., other types of information to be analyzed, a question to be answered, etc.), one or more qualifications of any user who performs the task, one or more geographical locations associated with the task, one or more capabilities and/or other current characteristics of one or more devices to be used as part of performing the task, one or more criteria related to task performance (e.g., deadlines for completion, format of results from task performance, etc.), one or more types of compensation to be provided to one or more task performer users who successfully perform the task, etc. The tasks may also be provided to task performer users 110 and/or game users in various manners. For example, a submitted task may include a visual representation, such as in the form of an image or in the form of an underlying textual representation that causes the visual representation to be generated when the task is displayed to a user (e.g., by including the textual representation as part of content to be rendered for display to the user for the task, such as in a frame or other portion of the displayed information).

Some tasks may further be "tailored" to a particular electronic game, and rendered and completed in the context of the electronic game. For example, the concept of a game may allow for the users' viewing particular images and providing comments—if so, tasks related to providing information about photos or other images could easily be included as part of those activities. As another example, content related to tasks for completion may be presented at defined locations within a virtual game world, such as through virtual representations of computer terminals rendered in the virtual world for game avatars to see and operate. As yet another non-limiting illustrative example, tasks related to rating the visual look of graphics or design elements may be presented to garners for completion as part of playing the electronic game. In addition, content providers or task providers may create tasks for performance that are relevant to a particular electronic game, with the criteria for performing such tasks optionally including that the tasks be performed as part of that game (e.g., with the game service system being designated as the allowable task performer for those tasks). In yet another instance, a new electronic game may be developed that may incorporate task performance activities in a form of, for example, sub-games within the game. It will be appreciated that there are many ways of creating tasks and adapting them for incorporation in an electronic game As noted above, in at least some embodiments, a task fulfillment system performs various automated operations to assist human task performer users to perform tasks submitted by other task providers. In particular, in some embodiments, one or more computing systems of a task fulfillment system act as an intermediary to allow task providers to programmatically request (e.g., via programmatic invocations of one or more APIs of the task fulfillment system by application programs of the task providers) that tasks be performed by human task performers, and to receive corresponding results after the tasks are performed (e.g., as responses to the programmatic invocations). The task fulfillment system may provide information (e.g., in a programmatic or interactive manner) about available tasks, and provide the results of task performance after the completion of tasks that they are assigned. By enabling large numbers of unaffiliated or otherwise unrelated task providers and task performers to interact via the intermediary task fulfillment system in this manner, free-market mechanisms mediated by the Internet or other public computer networks can be used to programmatically harness the collective intelligence of an ensemble of unrelated human task performers.

In some embodiments, some or all of the tasks to be performed are human performance tasks that use cognitive and other mental skills of human task performers, such as to employ judgment, perception and/or reasoning skills of the human task performers. The available tasks may be submitted by human task providers via application programs that programmatically invoke one or more application program interfaces of a task fulfillment system in order to request that the tasks be performed and to receive corresponding results of task performance in a programmatic manner, so that an ensemble of unrelated human agents can interact with the task fulfillment system to collectively perform a wide variety and large number of tasks.

The task fulfillment system may further perform a variety of additional activities to facilitate the performance of tasks in at least some embodiments. For example, the task fulfillment system may track the progression of the tasks through various states (e.g., an "open" state for tasks that are available to be performed, an "assigned" state for each assignment of a task to one or more task performers, a "completed" state for an assignment after the task performer provides the results of performance of the task, etc.), and may further take various actions corresponding to the tasks. In some embodiments a task provider may impose various criteria regarding performance of a task (e.g., required and/or preferred qualifications for task performers, time limits for task completion, etc.) and/or may specify various actions associated with task performance (e.g., payment of a specified fee under specified conditions). In this case, the task fulfillment system may enforce those criteria and initiate those actions as appropriate for the task.

As noted above, the humans who perform the tasks may be users of an electronic game that includes interactive content and/or interactive functionality provided by a game service system. Such electronic games may have various forms in various embodiments, as discussed in greater detail below. As one example, an electronic game may in some embodiments provide a "virtual world" in which the game users perform various activities, including optionally interacting with other game users in the virtual world, while in other embodiments an electronic game may include a user performing activities without interacting with other users (e.g., playing a solitaire card game, playing a Sudoku number-placement puzzle game, playing a game against computer-generated players, etc.). A virtual world is a genre of online community that often takes the form of a computer-based simulated environment, through which users can interact with one another and use and create objects. Many virtual worlds created for electronic games allow for multiple users. There are millions of players in on-line games around the world. For example, World of Warcraft® (WoW), a massively multiplayer online role-playing game (MMORPG) by Blizzard Entertainment®, had 11.5 million subscribers in 2008. In such situations, a user's device accesses a computer-simulated world and presents perceptual stimuli to the user, who in turn can manipulate elements of the modeled world and thus experiences "telepresence" to a certain degree. Such modeled virtual worlds may appear similar to the real world or instead depict fantasy worlds. The model world may simulate rules based on the real world or some hybrid fantasy world. Example rules are gravity, topography, locomotion, real time actions, and communication. Communication between users may include text, graphical icons, visual gesture, sound, touch, voice command, balance senses, etc.

Techniques described herein utilize an online gaming community to perform given tasks. Such an online gaming community may include, for example, one or more of the following: users who use their computing devices (e.g., general-purpose computer systems) to play a game that interacts with a game server (or the like) or that otherwise interacts with Web servers to play browser-based games on the computing devices, whether from online game servers, or by interacting with other types of sites that may make games available (e.g., social networking sites); users who use their dedicated game console devices to play console-based electronic games that include information provided via one or more electronic networks; users who use their handheld dedicated game playing devices to play device-based electronic games that include information provided via one or more electronic networks; users who use their smart phone devices to obtain and execute games locally on those devices, such as via so-called 'smart phone apps' applications; etc. Accordingly, the described techniques employ one or more systems (e.g., a game service system and task fulfillment system) configured to facilitate task submission, performance of tasks, providing of task performance information, and associated transactions. The systems may be controlled by electronic entities, such as entities that control an electronic game service or other interactive content provider and that control a task fulfillment system.

In one embodiment, a task provider provides a task (or a number of tasks) for completion, which is subsequently provided to a game service system, such as optionally via an intermediary task fulfillment system. The game service, if necessary, reconfigures the task such that it would be suitable for access and completion as part of playing an electronic game, and forwards the task for performance to one or more users who are playing the game. The game player user(s) then perform the task as part of playing the electronic game. The results of performing the task are then provided back to the task provider, such as optionally by the game service system and/or task fulfillment system.

In some embodiments, at least some tasks may be fee-based tasks that each have an associated fee to be paid to one or more task performer users for successful performance of the task, and at least some tasks may further have various restrictions and other criteria associated with performance of the task (e.g., preferred or required qualifications of human task performer users who perform the task). If so, the game service system may provide virtual non-monetary rewards to the game player users according to their participation in performing tasks, such as points, tokens, chips, "gold coins," credits, icons that are associated with a user account and/or with a game character, in-game items (e.g., swords, guns, armor, vehicles, plants, animals, etc.), titles (e.g., "Hero," "Champion," etc.), additional game modes, additional levels, service provider credit that can be applied to a monthly service fee paid to play a game, or other rewards typically earned in an electronic game. More generally, in at least some situations, the virtual non-monetary rewards provided to a game player user may include enabling the user to obtain access to functionality that was previously locked out or otherwise unavailable to the user, such as to reach a new level of the game, to obtain access to a new object or capability within the game, etc. In at least some such embodiments, the game service receives monetary compensation from task providers and/or a task fulfillment system for tasks that are performed by game player users via the game service, while the game player users receive such virtual non-monetary rewards.

As noted above, to facilitate the performance of tasks, the game service system may in some embodiments interact with one or more external task fulfillment systems via which the tasks are available. In some embodiments, the game service system 105 may instead directly interact with one or more task provider users to receive tasks that are available to be performed.

Additional details related to the function and operation of various embodiments of providing tasks for performance by task fulfillment systems, such as a task fulfillment facilitator system embodiment and/or a task server system embodiment, are included in co-pending commonly-owned U.S. patent application Ser. No. 10/990,949, filed Nov. 16, 2004 and entitled "Providing an Electronic Marketplace to Facilitate Human Performance of Programmatically Submitted Tasks;" and in co-pending commonly-owned U.S. patent application Ser. No. 12/966,873, filed Dec. 13, 2010 and entitled "Techniques For Providing Tasks To Users;" each of which is hereby incorporated by reference in its entirety.

Figure 2:
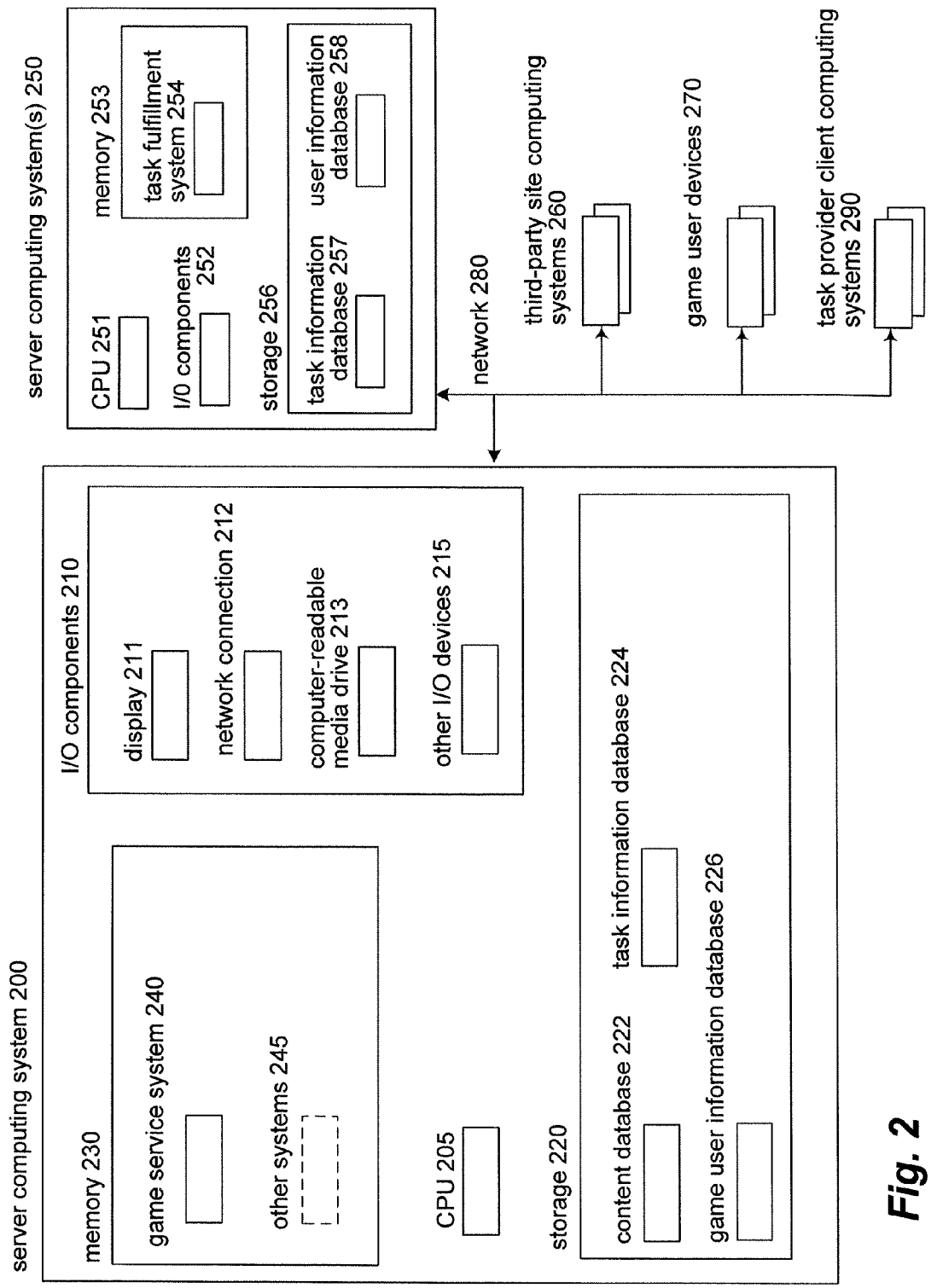
FIG. 2 is a block diagram illustrating an example computing system suitable for executing an embodiment of a system that facilitates providing tasks to users of electronic games.

FIG. 2 is a block diagram illustrating a computing system suitable for executing an embodiment of a game service system that automatically facilitates performance of tasks by users playing games in accordance with the described techniques. In particular, FIG. 2 illustrates a server computing system 200 suitable for executing an embodiment of an game service system 240, as well as various task provider client computing systems 290, devices 270 of game users (e.g., Internet-connected computing systems and smart phones, game consoles, etc.), and computing systems 260 used by external third-party entities to provide sites of interest.

In addition, FIG. 2 illustrates a server computing system 250 suitable for executing an embodiment of a task fulfillment system 254, although in other embodiments the game service system 240 and task fulfillment system 254 may be provided by a single group of one or more server computing systems 200 (e.g., if one of the optional other systems 245 executing in memory 220 is instead an embodiment of a task fulfillment system).

In the illustrated embodiment, the server computing system 200 includes one or more CPU ("central processing unit") processors 205, various I/O ("input/output") components 210, storage 220, and memory 230, with the illustrated I/O components including a display 211, a network connection 212, a computer-readable media drive 213, and other I/O devices 215 (e.g., a keyboard, mouse, speakers, etc.). The computing systems 250 each similarly include one or more CPU processors 251, various I/O components 252, storage 256, and memory 253, although particular I/O components are not illustrated in this example. The other computing systems and devices 260, 270 and 290 may each similarly include some or all such hardware components, but those components are not illustrated in this example for the sake of brevity.

In this illustrated embodiment, games running on game user devices 270 may connect to server computing system 200, which may be running the game service system 240 that is executing in the memory 230, and in at least some embodiments includes software instructions that when executed by the CPU 205 programs the server computing system 200 to perform some or all of the described techniques, such as when the game service system 240 represents a software implementation of the game service system 105 described with reference to FIG. 1. As described in greater detail elsewhere, the game service system may have various forms, such as an on-line game provider service, a social networking website, etc. In a specific example embodiment, the system 240 may provide content (e.g., an electronic game, information to be included within an electronic game, etc.) to devices 270, such as from content information database data structure 222 on storage 220 and/or by interacting with one or more computing systems 260 that provide content over the network 280 using the network connection 212. In other exemplary embodiments, a user may purchase a game from a store and use a device (e.g., a game console, a computer system, a tablet computing device, etc.) to connect to game service system 240 in order to play the game online and/or to obtain game-related functionality.

In addition, the system 240 may provide various tasks to the devices 270 for performance by the game users as part of playing electronic games or otherwise interacting with provided interactive content. For example, tasks can be obtained from the task information database data structure 224 on storage 220 after that information is obtained from the task fulfillment system 254 (e.g., from the task information database 257 on storage 256) and sent to devices 270. In addition, the system 240 may in some embodiments select particular tasks to provide to particular game users in various manners, including in some situations by using various user-specific information about the game users from the game user information database data structure 226 on storage 220 (e.g., previously specified user preference information, information based on historical activities of users in playing games, information about a current status and/or virtual location of a user within an electronic game, information about a current physical location and/or other attributes of the user, information about particular device functionality and capabilities of game-playing devices and/or other devices available to particular users, etc.).

The task fulfillment system 254 is executing in the memory 253 of the system(s) 250, and in at least some embodiments includes software instructions that when executed by the CPU 251 programs the one or more computing systems 250 to facilitate performance of tasks, such as when the task fulfillment system 254 represents a software implementation of the task fulfillment system 100 described with reference to FIG. 1. While not illustrated here, the task fulfillment system 254 may include multiple modules that each performs a subset of the functionality of the system 254. As described in greater detail elsewhere, the task fulfillment system may act as an intermediary to facilitate performance by task performer users of tasks supplied by task providers. The task fulfillment system 254 may further access and use various task-related and user-related information on storage 256, such as in task information database 257 and user information database 258. The task information database 257 may, for example, be used to implement the task information data repository 120 and task performance results information data repository 140 described with reference to FIG. 1, and the user information database 258 may, for example, be used to implement the user information data repository 150 described with reference to FIG. 1.

Human task provider users may use, for example, application programs (not shown) executing on the task provider client computing systems 290 to communicate via the network 280 with the task fulfillment system 254, such as to submit tasks to be performed and obtain results of performance of such task by task performer users. In addition, human task performer users may utilize Web browsers or other programs executing on other task performer client computing systems (not shown) to communicate via the network 280 directly with the task fulfillment system 254, such as to perform tasks and to provide task performance results. The programs used by the task provider users and/or task performer users may, for example, include custom client applications that communicate via standard and/or proprietary protocols with the task fulfillment system 254. In some embodiments, the task fulfillment system 254 may further provide an API that provides programmatic access to at least some of the functionality provided by the task fulfillment system 254.

It will be appreciated that computing systems and devices 200, 250, 260, 270, and 290 are merely illustrative and are not intended to limit the scope of embodiments of the present disclosure. The task fulfillment system 254 and/or the game service system 240 may instead each be executed by multiple interacting computing systems or devices, and computing system 200 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device or other device may comprise any combination of hardware and/or firmware that can interact in the described manners, optionally when programmed or otherwise configured with particular software, including (without limitation) desktops or laptops or tablets or other computers, network devices, PDAs, cell phones, smart phones and other wireless phones, pagers, electronic organizers, Internet appliances, television-based systems (e.g., using set-top boxes and/or personal/ digital video recorders), game consoles, media players and various other consumer products that include appropriate inter-communication capabilities. In addition, the functionality provided by the task fulfillment system 254 and/or game service system 240 may in some embodiments be provided via various modules that each perform a subset of the functionality of that system.

It will also be appreciated that, while various items are discussed or illustrated as being stored in memory or on storage while being used, these items or portions of them can be transferred between memory and other storage devices for purposes of memory management and data integrity. Alternatively, in other embodiments, some or all of the software systems and/or modules may execute in memory on another device and communicate with the illustrated computing systems via inter-computer communication. Furthermore, in some embodiments, some or all of the systems and/or modules may be implemented or provided in other manners, such as at least partially using firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules and/or data structures may also be stored as contents (e.g., as software instructions or structured data) of a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 3A:
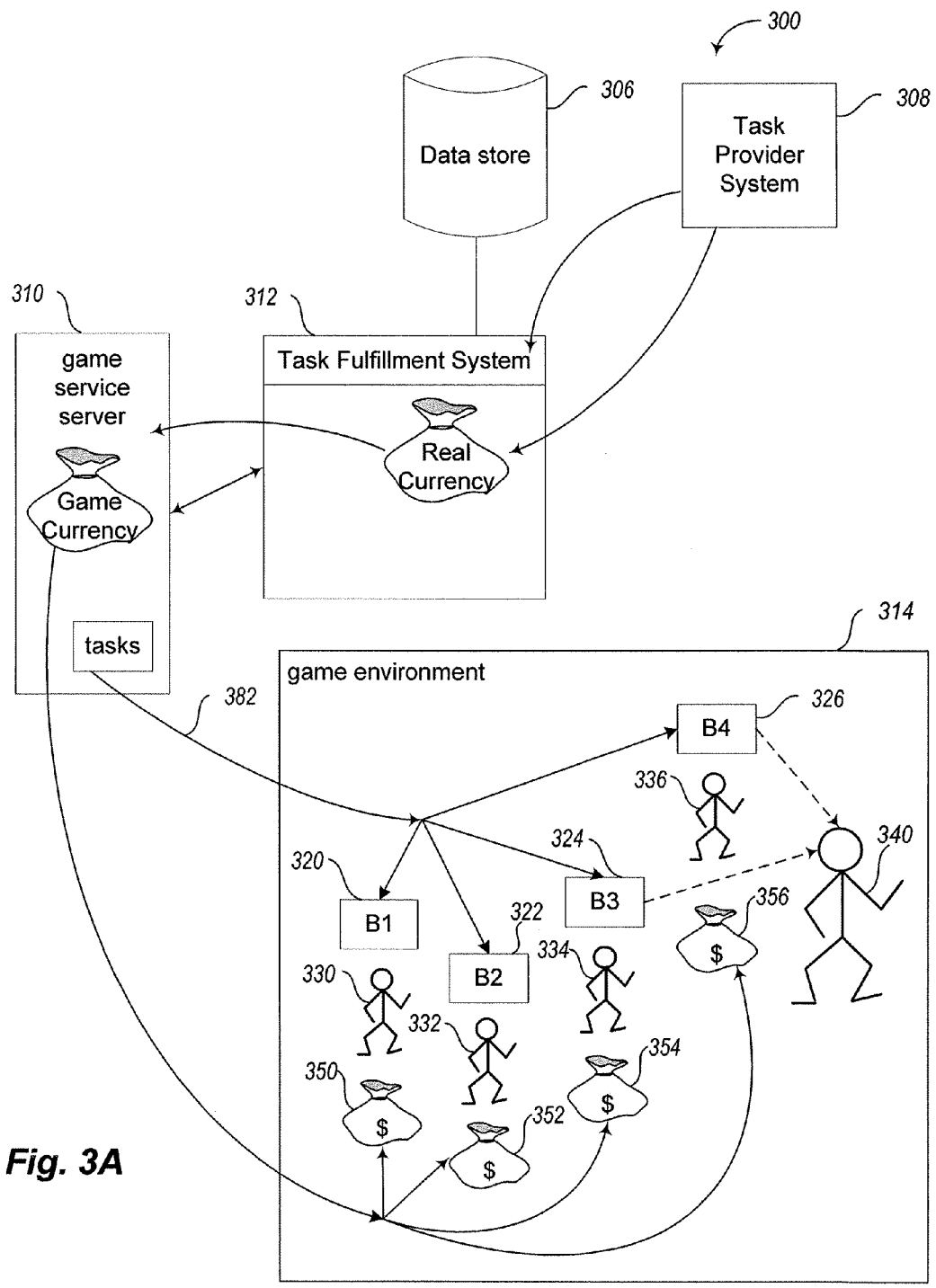
FIGS. 3A-3B illustrate examples in which tasks are available to be performed by users of an electronic game.

FIG. 3A is a diagrammatic representation of an example environment in which various of the proposed techniques may be practiced. It will be appreciated that the example diagram of FIG. 3A is provided merely for illustrative purposes and should not be construed as limiting the scope of the present disclosure. The diagram 300 includes a data store 306, a task provider system 308, a game service system server 310, a task fulfillment system server 312, and a depiction of an electronic game environment 314 provided by the game service system 310, such as for a virtual world that is shared my multiple users of the game. In one embodiment, the data store 306 is part of the task fulfillment system 322 (e.g., to store task information and/or user information), and the task fulfillment system may provide a task creation interface (not shown) to enable tasks to be provided for completion. In some embodiments, a task provider may further indicate that a particular task is available for users of electronic games.

The task provider system 308 sends tasks to be performed to the task fulfillment system 312. The task fulfillment system may operate a compensation system (not shown) in order to facilitate the exchange of compensation, e.g., payments between parties for transactions involving tasks, such as between task providers and the game service system 310

(e.g., to provide compensation from the task providers to the game service system for satisfactory performance of submitted tasks by game users). In some situations, task performance compensation may be made automatically after a task is performed (e.g., after automated verification is performed by the task provider system 308 on received task results to ensure that any criteria for the task have been met), while in other situations compensation may instead be provided only after the task provider has reviewed and accepted the results (or failed to reject the results after a specified period of time), or instead as soon as the task performance has been completed (e.g., before any verification of the results is performed). Thus, the task provider system 308 may be further configured to receive and process information related to a task completion. In other embodiments, the task fulfillment system server 312 may instead interact with an external compensation handling system (whether from the same organization that provides the task fulfillment server or instead from a third party) to receive and process the payments.

The game service system 310 may also perform operations to provide virtual non-monetary rewards to game users who perform tasks (e.g., points, dockings, chips, "gold coins," credits, coupons, certificates, virtual items, access to capabilities and other types of incentives). In addition, a variety of other types of compensation (e.g., payments) may be made in other situations, such as payments facilitated by the task fulfillment system 312 (e.g., to the game service for services provided by the game service, such as for performance of tasks by game users via game environment 314) and/or payments to or from one or more third parties, and/or "virtual" payments to task performers.

As shown in FIG. 3A, virtual non-monetary rewards (which take the form of "virtual currency" that is usable only within the game environment 314 in this example) may be provided for the task performance to avatars 330, 332, 334, and 336 representing different game users. The game environment 314 also includes a plurality of virtual terminals 320 (B1), 322 (B2), 324 (B3), and 326 (B4) operated by the avatars 330, 332, 334, and 336. In one embodiment, each terminal may display one or more tasks to be performed, such as may be supplied 382 by the game service system 310 after being obtained from the task fulfillment system 312. The game environment 314 may include the virtual currency items provided by the game service system 310 to the avatars 330, 332, 334, and 336, specifically, "virtual currency bags" 350, 352, 354, and 356. Avatar 340 is an example of a virtual representation of a human game user who just entered the game environment and familiarizes himself or herself with the task performed by other avatars 330, 332, 334 and 336. In one embodiment, if the human game user becomes interested in completing one of the tasks offered via a virtual terminal to the avatar 340, the user instructs the avatar 340 to join a group of other avatars performing the tasks and obtaining a virtual reward.

Figure 3B:
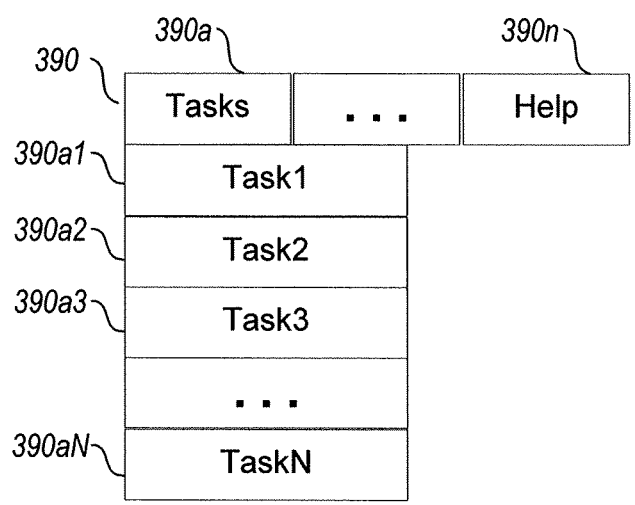

FIG. 3B illustrates an alternative example environment in which various of the proposed techniques may be practiced. In particular, in the example of FIG. 3B, a menu 390 is illustrated that a user of a game may access in order to obtain one or more tasks to perform, as discussed below. It will be appreciated that the example of FIG. 3B is provided merely for illustrative purposes and should not be construed as limiting the scope of the present disclosure. The example menu 390 may, for example, be provided as part of a game interface for a game being played by a user, such as for a game running within a browser (e.g., for a browser-based game), as part of a game application running on a user's computing device, etc. In the illustrated example, the menu 390 includes various user-selectable menu options 390a-390n, with menu option 390a providing task-related information in this example. In the example of FIG. 3B, a user has selected menu option 390a, and a resulting dropdown menu list is shown that includes various user-selectable entries 390a1-390aN, with each of the entries corresponding to a distinct task in this example. In other embodiments, such a menu may have other forms, and task information may be accessed in manners other than a menu. Thus, in this example, when playing the game, the user may access the menu option 390a and select a task corresponding to one of the task entries 390a1-390aN. In one implementation, the menu can be presented as a part of the game's tool bar along with icons that allow the user to save his or her state and the like. In an alternative embodiment, the menu can be accessed within the game by interacting with a non-playing character or some virtual terminal within the game world, or instead in other manners.

FIGS. 4, 5, 6 and 8 illustrate process flow diagrams for operation of various embodiments of a game service system described above in reference to FIGS. 1-3B. Those skilled in the art will appreciate that the steps in the process flow diagrams of FIGS. 4, 5, 6 and 8 described below may be altered in a variety of ways. For example, the order of the steps may be rearranged, sub-steps may be performed in parallel, shown steps may be omitted, other steps may be included, and the like.

Figure 4:
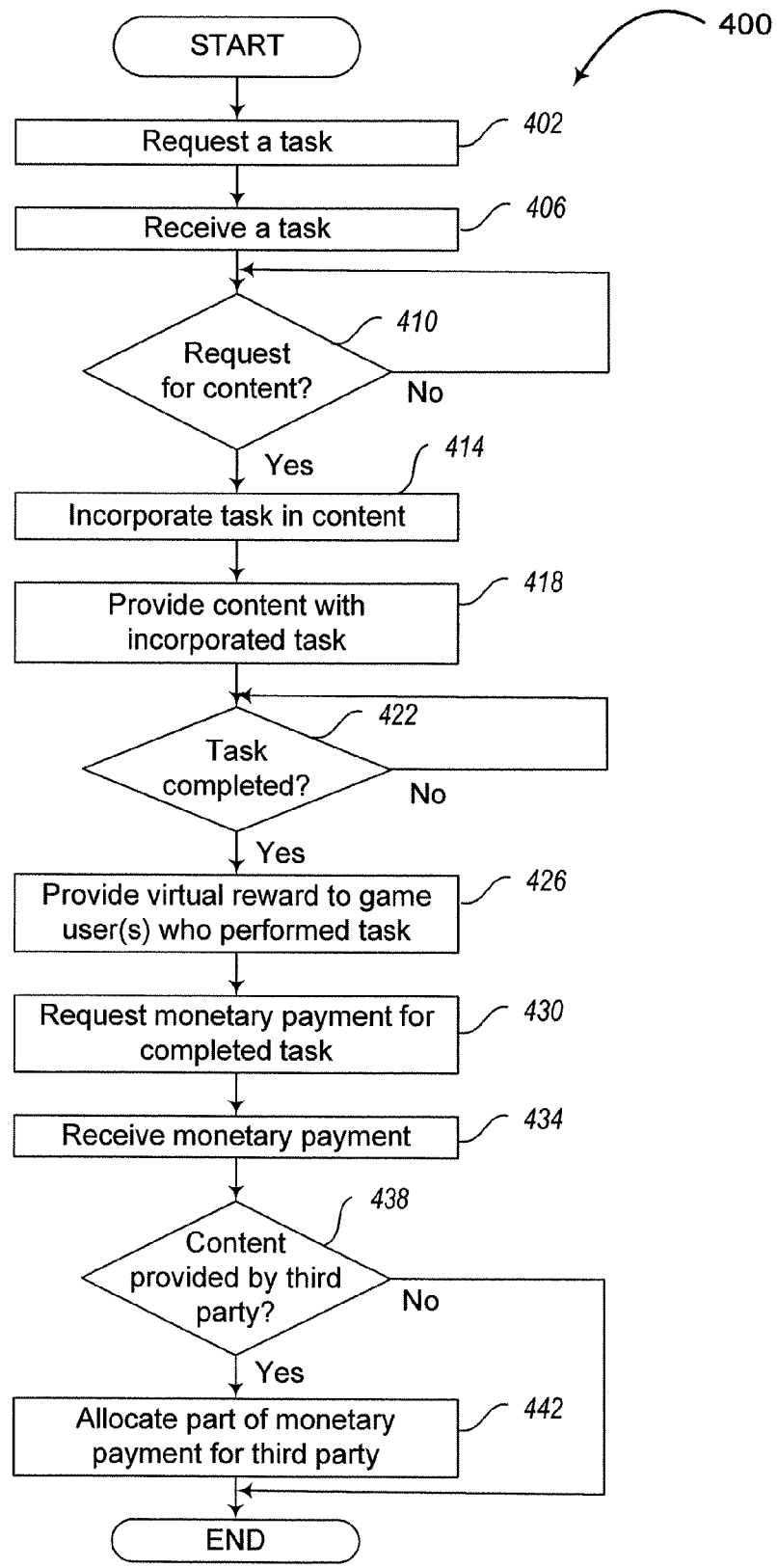
FIG. 4 illustrates a process flow diagram for operation of a game service system configured to facilitate task distribution in accordance with an embodiment.

FIG. 4 illustrates a process flow diagram for facilitating task distribution in accordance with one embodiment. The process 400 begins at block 402, where one or more tasks are requested by a game service system from a task fulfillment system. As described above, tasks may be previously submitted to the task fulfillment system by one or more task providers, or alternatively may be generated by the task fulfillment system in some situations.

At block 406, the task(s) are received by the game service system. At the decision block 410, the routine optionally determines whether a request for content, e.g., for an electronic game, was submitted by one or more users. If the request for content was received, in response to the request, the task is incorporated in the requested content at block 414 and provided to the users along with the content at block 418. In other embodiments, tasks may be provided to users at other times, such as when the tasks become available, periodically (e.g., once a day, once a week, etc.). At decision block 422, it is determined whether the task was completed by the user(s). If the task was completed, at block 426, a virtual reward is provided to the task performer(s). At block 430, the monetary payment for the task completion is requested by the game service system, such as from the task fulfillment system or instead directly from the task providers who submitted the performed task(s). At block 434, the requested payment is received. At decision block 438, it is determined whether the requested content (e.g., an electronic game) was provided by a third party. If the content was provided by the third party, a portion of the monetary payment may optionally be allocated to compensate the third party content provider at block 442. The process 400 then ends. In some embodiments, the game service system may use an advertisement-supported revenue model for at least some games or other interactive content provided to at least some users (e.g., by deriving revenue from display advertisements to the users, whether directly for the display or instead based on subsequent actions such as ad selection and/or product purchase)—if so, the game service system may further use an in-game task performance revenue model instead of the advertisement-supported revenue model for at least some games or other interactive content provided to at least some users, such as to offset some or all of the revenue that would have been received from the advertisement-supported revenue model, including to optionally provide games or other content using the in-game task performance revenue model at a reduced cost (e.g., free) for a game user relative to a cost of providing that same game or other content without using the in-game task performance revenue model.

Figure 5:
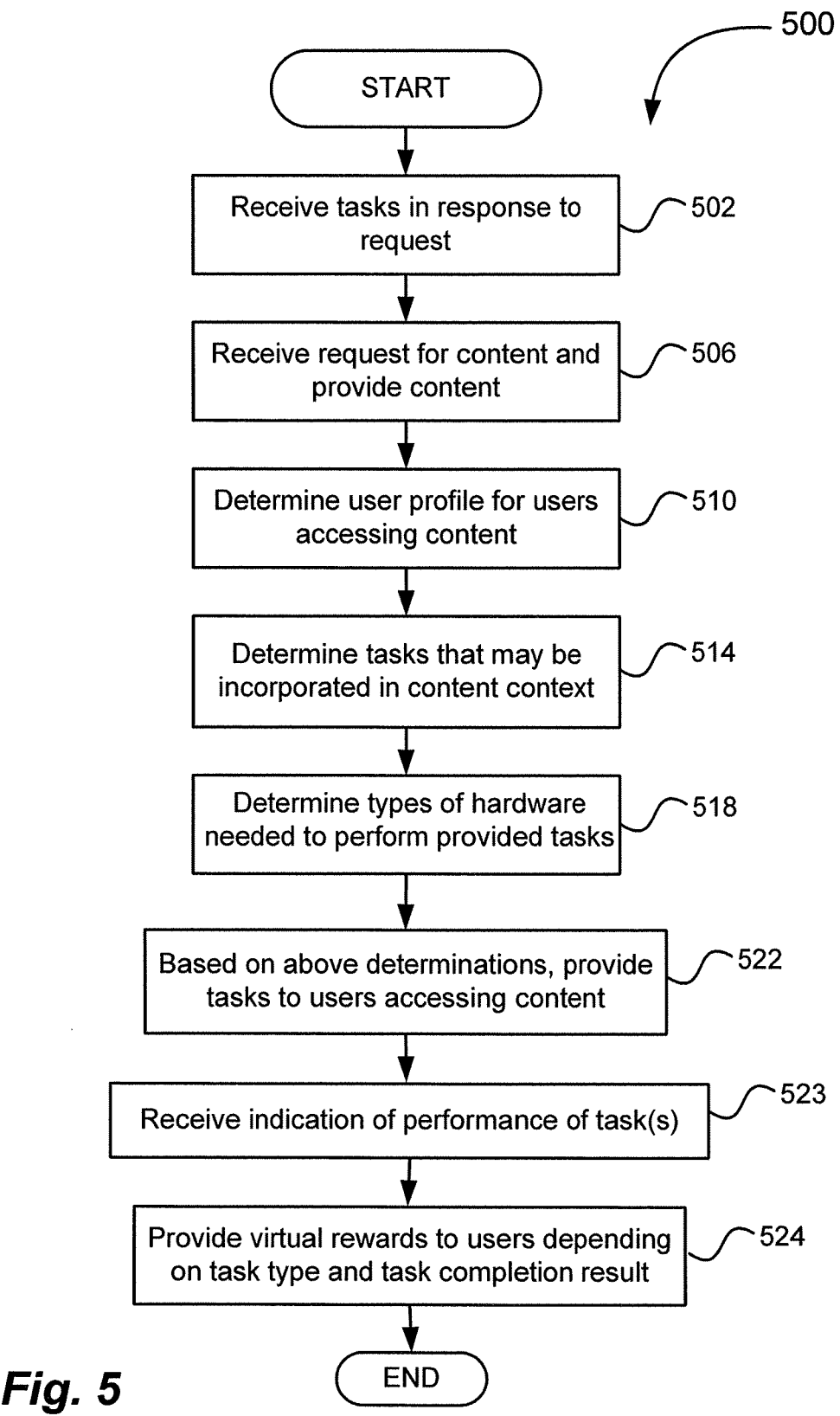
FIG. 5 illustrates a process flow diagram for operation of a game service system configured to facilitate task distribution in accordance with another embodiment.

FIG. 5 illustrates a process flow diagram for facilitating task distribution in more detail, specifically, in regard to task allocation. The process 500 begins at block 502 where a plurality of tasks are received by a game service system, for example, in response to a request. At block 506, a request for interactive content (e.g., for an electronic game) is received from one or more users and, in response to the request, the content may be provided to the users. In other embodiments, the electronic game may be obtained by the user in other manners, and the interactive content may be provided as part of functionality being provided that is related to the electronic game.

At block 510, user-specific information for the users may be determined, such as for use in selecting particular tasks to provide to particular users. For example, such user-specific information may include user-specific historical information related to accessing games, performing in-game activities and/or performing tasks, a current status of a user within the game, a physical location of the user, a user's age, a user's interests, a user's task performance qualifications, a user's device(s)' capabilities, and the like. In one embodiment, user profile information may be derived from a user's profile associated with the game service or a particular game. In another embodiment, user profile information may be compiled by accessing, for example, after obtaining the user's permission, sites that the user has frequented (e.g., social networking sites). User preferences and capabilities related to task performance may be discerned from the compiled information.

At block 514, particular task(s) are determined that may be incorporated in the requested and accessed content. As described above in reference to FIG. 1, a task created for human performance may be "adapted" to be performed in an on-line world or "tailored" to a particular game in some embodiments. Furthermore, the selection of the tasks to be distributed to the users by incorporating the tasks in the content may be based in part on the determined user preferences and interests. For example, if it is determined that a particular task or subset of tasks may not be of any interest to the users or the users may not have sufficient qualifications to perform the tasks, these tasks may not be considered for incorporation in the requested content.

At block 518, types of hardware devices and/or device capabilities that are best suited for performance of particular tasks are determined, and functionality associated with the provided content may similarly be determined. For example, some tasks may be best performed (or only performed) using motion-sensitive handheld game controllers (e.g., a Wiimote® device), using motion sensing systems (e.g., a Kinect® system), a camera (whether video and/or still image), a tilt or other motion sensing capability of hardware implemented in a smart phone device, and the like. In addition, in one embodiment, a user may receive information about a task via accessed content (e.g., an electronic game), but may use one or more separate hardware devices outside of the game to perform the task—for example, if the task is displayed via a game being executed on a dedicated game console, the task may be performed on a separate computing system or device of the user.

At block 522, based on above determinations, one or more tasks may be provided to one or more users accessing a particular electronic game. For example, some tasks may be provided within the context of the game, while others may be provided outside of the game, but in association with the provided game. For example, the task information may be transferred to a separate computing system or device of the user to be performed in various manners, such as by the game service system (e.g., automatically using stored user-specific information, or after a corresponding request from the user), by the user (e.g., by directing the game-playing device to transfer task-related information to another device, such as via a local Bluetooth connection or via a network connection), etc. Tasks may be further tailored to particular users based on the user profiles determined at block 510. Tasks may be also tailored to particular equipment (hardware/software) based on the equipment availability and characteristics determined at block 518.

At block 523, a determination is made that the performance of one or more of the tasks has been completed by the user. For example, a user playing the game may perform the task, and the game may send a communication indicating that the task performance is complete (optionally along with any results generated by completing the task) to game service system 310 and/or task provider system 308. In the instance where the task was completed on a device other than the one executing the game, once the task has been completed, a communication that indicates that the task performance was completed (optionally along with any results generated by completing the task) may be sent by the other device to task provider system 308 and/or game service system 310. For example, information (e.g., a code) that indicates that the task was completed may be displayed on a screen associated with the other device, and the user may input the code into the electronic game. In another example, the user could email the information to task provider system 308 and/or game service system 310, or enter the code in a Web page provided by one of those systems. In yet another embodiment, the other device may upload the information that indicates that the task was completed.

At block 524, virtual rewards are provided to the users who participated in the task performance. Virtual rewards may vary depending on a task type, game type, or user preferences for a reward as will be described below in reference to FIG. 6. The task completion information, e.g., the data related to the task completion, may be provided to the entity requesting the task completion (e.g., a task provider). The process 500 then ends.

Figure 6:
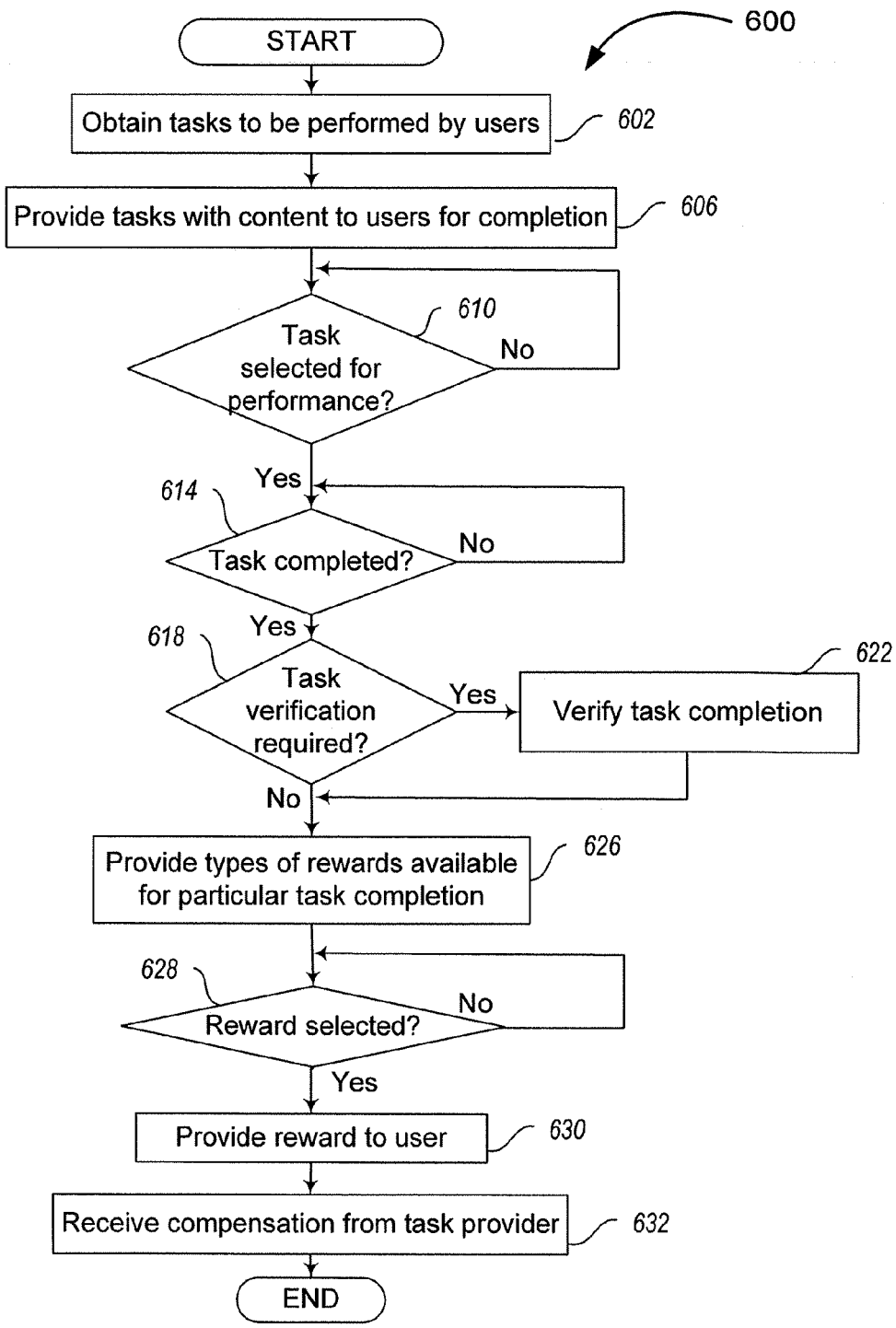
FIG. 6 illustrates a process flow diagram for operation of a game service system configured to facilitate task distribution in accordance with yet another embodiment.

FIG. 6 illustrates a process flow diagram for facilitating task distribution in more detail, specifically, in regard to the virtual reward allocation and distribution in compensation for task completion. The process 600 begins at block 602 where tasks are obtained, for example, from a task fulfillment system. At block 606 the obtained tasks are provided to users along with requested content (e.g., information for an electronic game) as described above in reference to FIGS. 4 and 5.

At decision block 610, it is determined whether any task is selected by a user or users for performance as part of playing the electronic game. For example, a user may have preferences for a particular type of task depending on the user's interests, qualifications, and/or experience with task performance. In one embodiment, a user may choose to complete a task or set of tasks offered within a game to achieve a defined in-game goal, in lieu of other in-game activities to achieve that particular goal—in other embodiments, the game creator and/or game service may provide such in-game tasks as the only way for the game users to achieve the defined in-game goal, in lieu of other types of in-game activities that would otherwise have been provided if tasks were not available. In some embodiments, a user may further be allowed to select between different types of tasks and/or virtual rewards, such as a first type of task that provides immediate smaller rewards without verification and a second type of task that provides deferred larger rewards after verification. A user may further elect to perform particular task types, e.g., in lieu of non-task activities, instead of other alternative task types, and the like. Furthermore, different types of virtual rewards may be provided to users for selection based on types of tasks and whether the task performance results have been verified.

If a task is selected, at decision block 614 it is determined whether the performance of the selected task is completed in the electronic game. If the task is completed, at decision block 618, it is determined whether task completion verification is to be performed. If the task is of a type that has completion verification, such verification occurs at block 622. After block 622, or if verification is not performed, virtual rewards of different types may be provided to the user or users who participated in the task completion at block 626 (although virtual rewards may not be provided if verification activities in block 622 are not successfully performed). As described above, depending on a type of task, smaller rewards for tasks without verification or larger rewards for tasks requiring verification may be offered. As described above, various types of virtual non-monetary rewards may be used, including adding functionality to help a user achieve a game goal, such as, for example, unlocking a particular game feature. In one embodiment, a user may be offered rewards that are not directly associated with the particular electronic game the user is playing. For example, rewards may include virtual currency applicable in different online environments, such as gold coins, Facebook® points, Zynga® cash, Farm® points, and the like, that could be later turned in a desired virtual good.

In some embodiments, a user may be allowed to select a particular type of reward for a performed task. If so, at decision block 628, it is determined whether a particular reward from the reward types described above is selected by the user or user who completed the task. If the reward is selected, at block 630, the selected reward is provided to the user(s). Finally, at block 632, monetary compensation for a completed task is received by the game service. The process 600 then ends.

Figure 8:
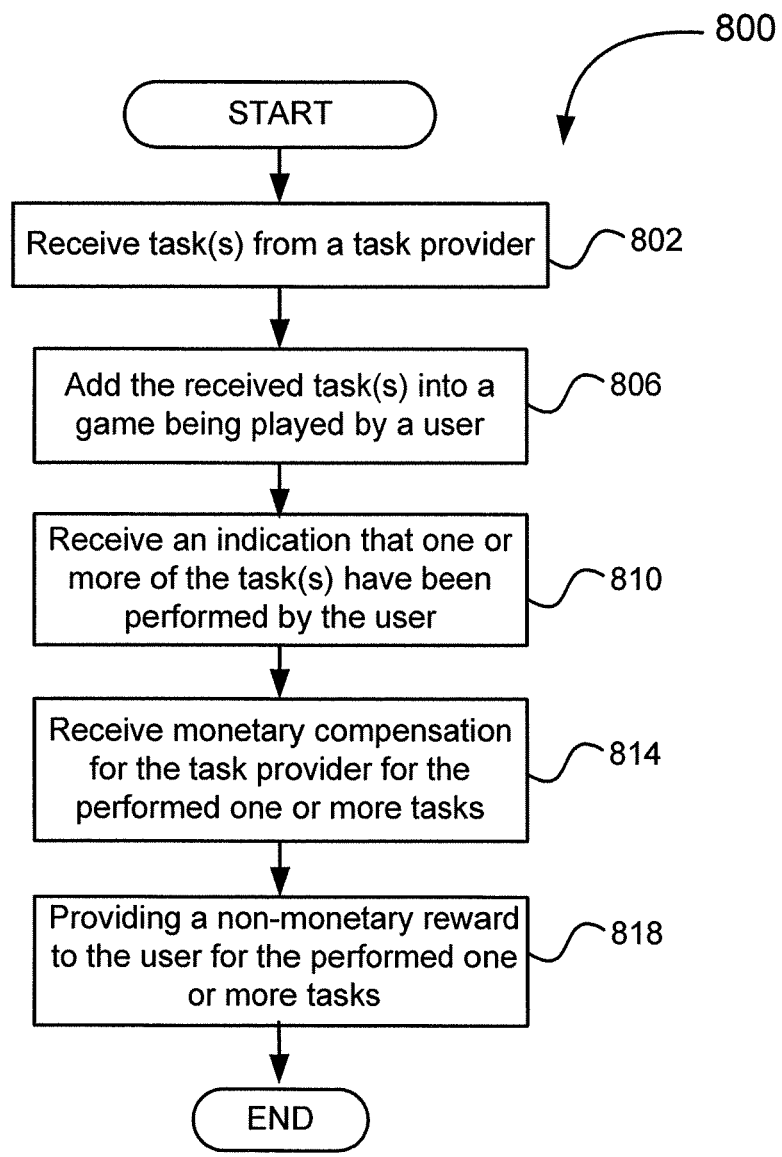
FIG. 8 illustrates a process flow diagram for operation of a game service system configured to facilitate task distribution in accordance with yet another embodiment.

FIG. 8 illustrates a process flow diagram for facilitating task distribution in accordance with one embodiment. The process 800 begins at block 802, where one or more tasks that are available to be performed are received from a task provider, whether directly from the task provider, or via an intermediate task fulfillment system. In block 806, the process adds the received tasks into a game being played by a user, such as in conjunction with other interactive content being provided for the game, or instead to supply particular tasks for the user (e.g., in response to a user request). In block 810, the routine then later receives an indication that one or more of those tasks added into the game have been performed by the user. In block 814, the routine receives monetary compensation that is provided by the task provider for the one or more performed tasks, whether directly from the task provider, or via the intermediate task fulfillment system. In block 818, the process then provides one or more non-monetary rewards to the user for the one or more performed tasks, such as in-game virtual rewards or other types of non-monetary rewards. While not illustrated, the routine may further perform other operations, such as to receive results of the performance of the tasks and to optionally send the performance results to the task provider, optionally via the intermediate task fulfillment system. After block 818, the routine ends.

Figure 7A:
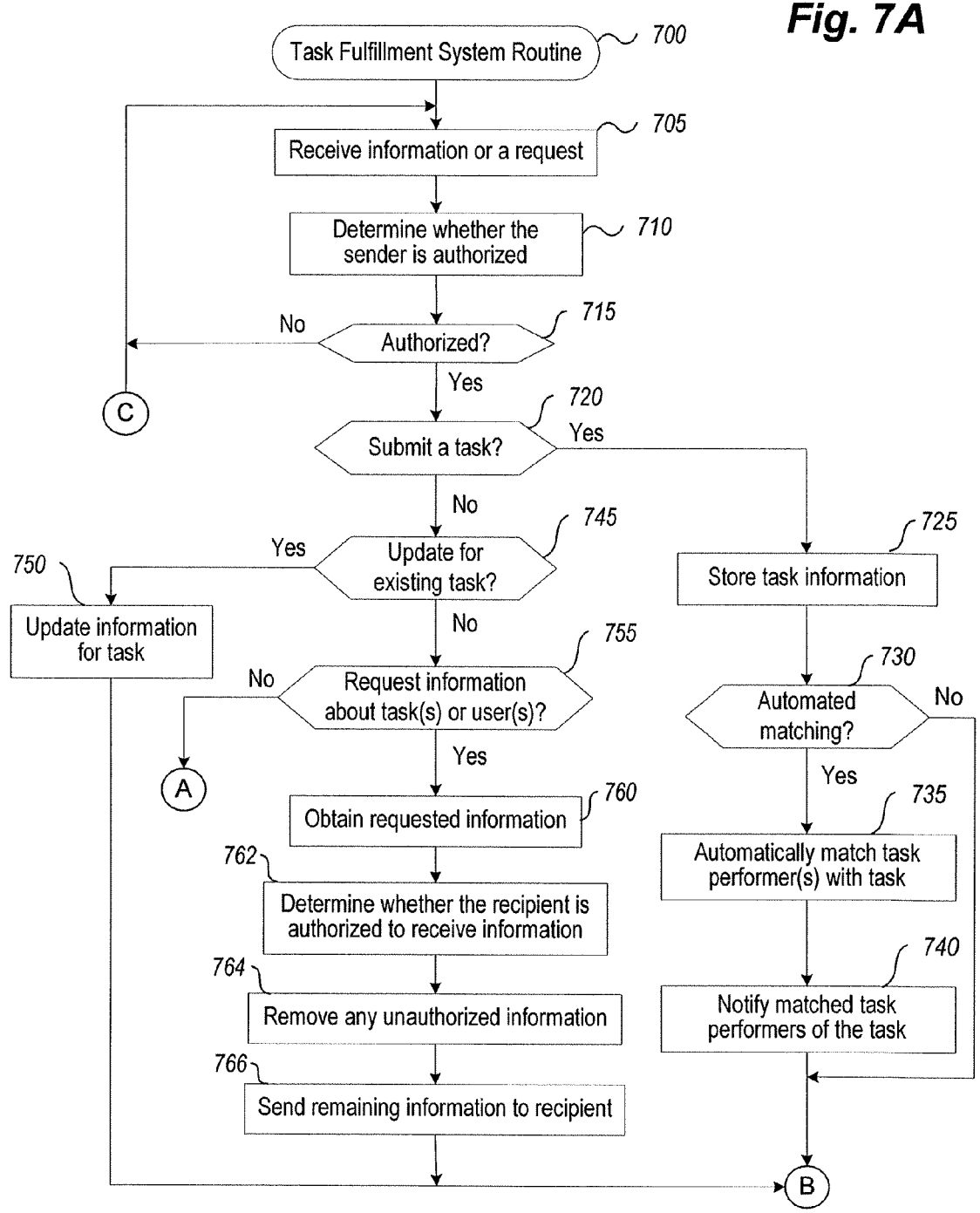
FIGS. 7A and 7B illustrate a process flow diagram for operation of an example embodiment of a task fulfillment system.
Figure 7B:
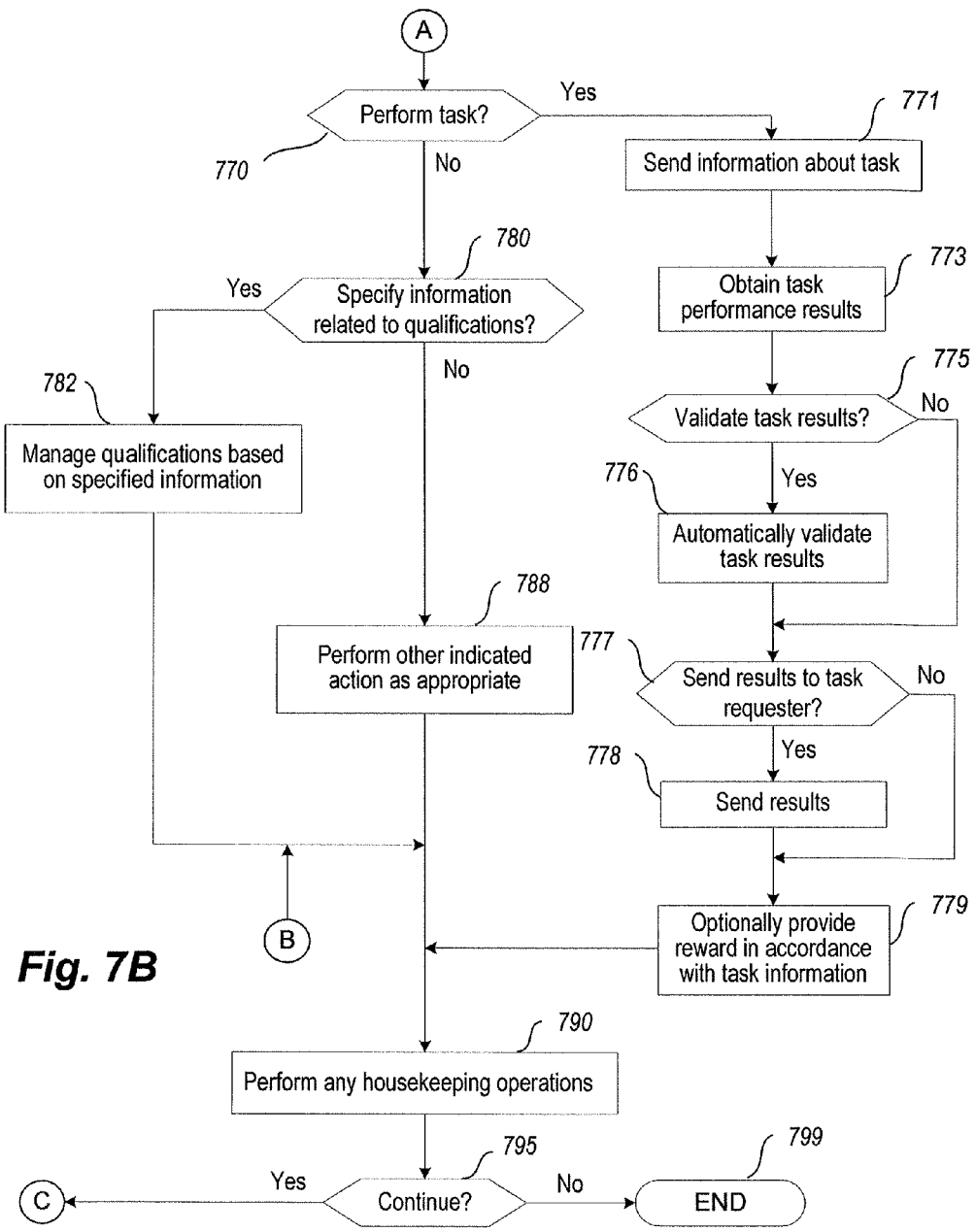

FIGS. 7A and 7B are a flow diagram of an example embodiment of a Task Fulfillment System routine 700. The routine may be provided by, for example, execution of an embodiment of the task fulfillment system 100 of FIG. 1 and/or the task fulfillment system 254 of FIG. 2, such as to in this illustrated embodiment facilitate performance of tasks by interacting with task providers, task performer users and others (e.g., a game service system on behalf of one or more game users acting a task performer users) as appropriate.

In this illustrated embodiment, the routine begins at block 705, where an indication is received of information or a request, and in block 710 determines whether the sender of the information or request is authorized to perform requests of that type or provide information of that type (e.g., based on prior registration of the users with the task fulfillment system, and/or on other previously defined access controls for specific users or types of users). If the routine identifies the sender as authorized in block 715, or if an authorization determination is not performed, the routine continues to block 720 to determine whether the received indication is a request to submit one or more tasks. If so, the routine continues to block 725 to store task information received in block 705, including any specified task performance criteria related to task performance, information about any associated rewards for performance of the task, any associated information to be analyzed or manipulated as part of the task, etc. The routine then continues to block 730 to determine whether to perform automated matching to identify task performer users who are appropriate to perform the task, such as based on the type of task submitted and/or an explicit request by the submitter of the task, although in other embodiments such automated matching functionality may not be provided. In the illustrated embodiment, if automated matching is to be performed, the routine continues to block 735 to automatically match one or more task performer users with the task by, for example, identifying one or more task performer users whose qualifications satisfy any qualification criteria for the new task. The routine then notifies those identified task performer users of the task in an appropriate manner in block 740 (e.g., based on previously specified user notification preferences for those task performer users). After block 740, or if it is instead determined in block 730 that automated matching is not to be performed, the routine continues to block 790.

If it is instead determined in block 720 that the received indication is not to submit a task, the routine continues instead to block 745 to determine whether a request is received to perform an update for an existing task, and if so continues to block 750 to perform the update as appropriate. Such updates may take a variety of forms, such as to modify information about or delete a pending task that has not been performed; to perform an indicated activity related to a task (e.g., to cause monetary compensation to be provided to a task performer user after the task provider has reviewed and accepted task performance results from that task performer user); to add, modify, or remove performance criteria associated with an existing task; to add or modify task release criteria associated with a task that has not yet been released (e.g., a task that is part of a group having at least some tasks of the group that have not yet been released); etc.

If it is instead determined in block 745 that the received indication is not to update an existing task, the routine continues to block 755 to determine whether the received indication is a request for information about one or more tasks and/or one or more users, such as for a search or browse request. If so, the routine continues to block 760 to identify and obtain the requested information, and then continues to block 762 to determine whether the indicated recipient of the information is authorized to receive all of the obtained information, such as based on access controls associated with any aspects or elements of the obtained information (although in other embodiments the access determination may be made before or as part of the obtaining of the information). In block 764, the routine then removes information for which the recipient is not authorized, if any, and in block 766 sends any remaining information to the recipient. In some embodiments, indications may be provided to the recipient of any removed information for which they were not authorized, while in other embodiments such indications may not be provided. After blocks 750 or 766, the routine continues to block 790.

If it is instead determined in block 755 that the received indication is not a request for information about tasks or users, the routine continues instead to block 770 to determine whether the received indication is a request from a task performer user to perform an indicated task. If so, the routine continues to block 771 to retrieve and provide information about the task to the task performer user in an appropriate manner (e.g., in a manner specified for the task), and in block 773 obtains results of performance of the task by the task performer user. As previously noted, in some embodiments a game service system may make a request for task information as a task performer user (e.g., without identifying any game users to actually perform the tasks, such as if the game service system is identified as the actual task performer user who is responsible for task performance and who receives corresponding monetary compensation). In block 775, the routine then determines whether to automatically validate the task results, such as based on whether a task provider has specified that the results for the task are to be validated. If so, the routine continues to block 776 to automatically validate task results. Validating task results may be performed in various ways, such as type checking the task results (e.g., by determining whether the task result comprises an integer or other type of data), range checking the task results (e.g., by determining whether a task result is within a particular value range), etc.

After block 776, or if it is instead determined in block 775 not to validate the task results, the routine continues to block 777. In block 777, the routine then determines whether to immediately send the task results to the task provider, such as based on information associated with the task, the outcome of the automated validation of block 776, and/or user preferences for the task provider. If so, the routine continues to block 778 to send the results. After block 778, or if it is instead determined in block 777 not to send the results to the task provider at this time, the routine continues to block 779 to optionally provide any reward associated with the task to the task performer user, such as in accordance with the task information and/or the outcome of the automated validation of block 776. After block 779, the routine continues to block 790.

While the illustrated embodiment indicates a synchronous flow in which the routine waits for and obtains task performance results in block 773 after sending the task information in block 771, in other embodiments the routine may be structured in other manners, such as to continue with other processing while waiting for such task results (if any) to be received. In addition, in some situations, task performer users may not provide task results for a task after they accept an assignment to perform the task, which may be indicated to the routine in an explicit message from the task performer user that the task performer user is abandoning or withdrawing from task performance, or instead by not receiving task results within a specified period of time—if so, the routine may continue to handle other task-related requests and information. In addition, while not illustrated here, in other embodiments various types of notifications may be sent to task providers related to their submitted tasks, such as when a task is assigned to a task performer user for performance and/or when an assigned task is withdrawn from a task performer user who has not completed the performance.

If it is instead determined in block 770 that the received indication is not to perform a task, the routine continues instead to block 780 to determine whether the received indication is to specify information related to user qualifications, and if so continues to block 782 to manage qualifications based on the specified information. Managing qualifications may include, for example, defining a new type of qualification for use with the system, specifying a particular qualification for a particular user, removing a particular qualification from a user, removing a particular qualification from the system, etc.

If it is instead determined in 780 that the received indication is not to specify qualification-related information, the routine continues instead to block 788 to perform another indicated operation as appropriate, such as to receive and store various types of user information (e.g., information related to a user's identity or attributes, information related to an account of a user with the system, etc.), information related to specifying access controls for information and/or functionality, administrative requests related to system operations, requests for information related to monitoring performance of tasks or other operations of the system, an indication of a task performer user withdrawing from or abandoning an assignment to perform a task, etc.

After blocks 740, 750, 766, 779, 782, or 788, the routine continues to block 790 to optionally perform any additional housekeeping operations, such as to store information that is generated or received during execution of the routine, to generate summary aggregate information for the system related to tasks and users, to take appropriate actions when events do not occur within specified periods of time (e.g., to withdraw assigned tasks from task performer users who do not timely perform the tasks, or to provide rewards to task performer users for tasks that they have performed when task providers do not timely reject the task results provided by the task performer users), etc. After block 790, the routine continues to block 795 to determine whether to continue, such as until an explicit indication to terminate is received. If so, or if it is determined in block 715 that the sender is not authorized, the routine returns to block 705, and if not continues to block 799 and ends.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method, comprising:
providing, by a configured computing system of a game provider, multiple copies of an electronic game to multiple devices used by multiple users;
sending, by the configured computing system, an electronic request to a remote task fulfillment system for information about multiple tasks that are available to be performed by humans in exchange for monetary fees, the multiple tasks provided to the task fulfillment system by task providers for performance by other human task performers affiliated with the task fulfillment system;
receiving, by the configured computing system, the information about the multiple tasks from the task fulfillment system in response to the sent electronic request;
during playing of the multiple copies of the electronic game by the multiple users,
providing, by the configured computing system, the multiple tasks to the multiple users as part of the playing of the multiple copies of the electronic game on the multiple devices; and
receiving, by the configured computing system, results of performance by the multiple users of the provided multiple tasks as part of the playing of the multiple copies of the electronic game on the multiple devices;
sending, by the configured computing system, the received results of the performance of the provided multiple tasks to the task fulfillment system; and
receiving, by the configured computing system, monetary compensation for the game provider for the performance of the provided multiple tasks that is provided by the task providers, and providing, by the configured computing system, non-monetary virtual rewards to the multiple users for the performance of the provided multiple tasks, the provided non-monetary virtual rewards being rewards within the electronic game that are usable by the multiple users as part of the playing of the multiple copies of the electronic game on the multiple devices.

2. The method of claim 1 wherein the providing of the multiple tasks to the multiple users includes, for each of one or more of the multiple users, retrieving information about prior activities of the user and determining a current status of the user within the electronic game, and selecting one or more of the multiple tasks to be provided to the user based at least in part on the retrieved information and on the determined current status.

3. A computer-implemented method, comprising:
retrieving, over one or more computer networks and by a computing system for an electronic game, information from a remote task fulfillment system about a task that is submitted by a task provider and is available to be performed by one or more humans in exchange for monetary compensation from the task provider;
sending, by the computing system, the task to a computing device executing the electronic game for a user playing the electronic game, the electronic game being configured to present the task to the user as part of the playing of the electronic game;
receiving, by the computing system, a result indicating that the task was performed by the user as part of the playing of the electronic game;
receiving, by the computing system, the monetary compensation for performance of the task from the task provider; and
providing, by the computing system, a non-monetary reward to the user for the performance of the task, the provided non-monetary reward being part of the electronic game and usable by the user as part of the playing of the electronic game.

4. The computer-implemented method of claim 3 further comprising:
determining information regarding the user that includes a current geographical location of the user external to the electronic game; and
selecting the task to send to the user based at least in part on the determined information.

5. The computer-implemented method of claim 3 further comprising:
determining one or more preferences of the user in performing tasks based at least in part on information specifying a user profile for the user; and
selecting the task to send to the user based on the determined one or more preferences.

6. The computer-implemented method of claim 3 further comprising:
determining a hardware capability associated with the computing device; and
selecting the task to send to the user based on the task using the determined hardware capability.

7. The computer-implemented method of claim 6 wherein the determined hardware capability is at least one of a motion-sensing capability or a camera capability.

8. The computer-implemented method of claim 3 wherein performance of the task by the user occurs at least in part by the user using a device for the performance of the task that is different than the computing device.

9. The computer-implemented method of claim 3 wherein the providing of the non-monetary rewards includes enabling access of the user to functionality within the electronic game that was not previously accessible to the user.

10. The computer-implemented method of claim 3 further comprising:
receiving, by the computing system, input from the user selecting either a first type of virtual rewards or a second type of virtual rewards, the first type being used with one or more first tasks for which associated virtual rewards of the first type are not provided until results from performance of the first tasks are verified, the second type being used with second tasks for which associated virtual rewards of the second type are provided without verifying results from performance of the second tasks, the virtual rewards of the first type providing greater benefits than the virtual rewards of the second type; and
selecting the task to send to the user based on the input received from the user, the selected task being one of the first tasks if the received input from the user selects the first type of virtual rewards and being one of the second tasks if the received input from the user selects the second type of virtual rewards.

11. The computer-implemented method of claim 3 wherein the electronic game is at least one of a game-console-based game, a browser-based game, a smart-phone-based game application, or a game provided as part of a social networking site.

12. The computer-implemented method of claim 3 wherein the computing system is part of a game service that provides functionality for the electronic game and that is separate from the remote task fulfillment system, and wherein the sending of the task to the computing device includes providing the electronic game and the task to the computing device via one or more communications sent over one or more networks, the sent task being provided for performance by the user as part of the playing of the electronic game in lieu of one or more other in-game activities that the user would otherwise perform to achieve a specified goal within the electronic game.

13. The computer-implemented method of claim 3 wherein the computing system is part of a game service that provides functionality for the electronic game and that is separate from the remote task fulfillment system, and wherein the task is selected by the task fulfillment system to be provided to the game service as part of the retrieving of the information based at least in part on the task being designated by the task provider to be performed by users of the electronic game.

14. The computer-implemented method of claim 3 wherein the computing system is part of a game service that provides functionality for the electronic game and that is separate from the remote task fulfillment system, and wherein the method further comprises allocating at least a portion of the received monetary compensation to a content provider that provided the electronic game.

15. A non-transitory computer-readable medium whose contents configure a computing device to automatically perform a method, the method comprising:
   obtaining information about one or more tasks that are available to be performed from a task fulfillment system for monetary compensation, the obtaining of the information being performed by the configured computing device;
   during playing of an electronic game by one or more users, providing the one or more tasks to the one or more users; and
   after the provided one or more tasks are performed by the one or more users as part of the playing of the electronic game by the one or more users, providing virtual rewards to the one or more users for performance of the provided tasks, an amount of the provided virtual rewards being based at least in part on an amount of the monetary compensation that is provided to a provider of the electronic game for the performance of the provided tasks, the provided virtual rewards being usable by the one or more users as part of the playing of the electronic game.

16. The non-transitory computer-readable medium of claim 15 wherein the method further comprises sending one or more electronic communications to the task fulfillment system that include results of the performance of the provided tasks by the one or more users after the results are received by the configured computing device, and wherein the obtaining of the information about the one or more tasks includes receiving one or more electronic communications from at least one of the task fulfillment system and of a game provider that provides the electronic game to the configured computing device.

17. The non-transitory computer-readable medium of claim 15 wherein the method further comprises executing the electronic game for the one or more users on the configured computing device, and wherein the configured computing device includes one or more input devices used by the one or more users as part of the playing of the executing electronic game.

18. The non-transitory computer-readable medium of claim 15 wherein the configured computing device is part of a game service that provides functionality for the electronic game to multiple game-playing devices of multiple users, and wherein the method further comprises receiving and retaining the monetary compensation for the performance of the provided tasks from the task fulfillment system.

19. The non-transitory computer-readable medium of claim 15 wherein the computer-readable medium is a memory of the configured computing device, and wherein the contents are instructions that when executed program the configured computing device to perform the method.

20. A computing system configured to automatically facilitate performance of tasks by users, comprising:
   one or more processors; and
   a provider system that is configured to, when executed by at least one of the one or more processors, facilitate performance of tasks by users of provided interactive content, the facilitating of the performance of the tasks including:
      obtaining information over one or more networks from a task fulfillment system about multiple tasks that have been submitted to the task fulfillment system as being available for human performance;
      providing information about the multiple tasks to one or more users who are using one or more devices to interact with interactive content provided by the provider system, the provided information enabling the one or more users to perform the multiple tasks as part of interacting with the provided interactive content; and
      after the multiple tasks are performed by the one or more users as part of the interacting with the provided interactive content, providing virtual rewards to the one or more users for the performance of the multiple tasks and receiving an indication of monetary compensation to be received by the provider system for the performance of the multiple tasks, the provided virtual rewards being usable by the one or more users as part of interacting with the provider system.

21. The computing system of claim 20 wherein the provided interactive content is part of a game being played by the one or more users, and wherein the obtaining of the information from the task fulfillment system about the multiple tasks includes interacting with the task fulfillment system via one or more communications sent over the one or more networks.

22. The computing system of claim 21 wherein the providing of the virtual rewards to the one or more users includes providing, to each of the one or more users, one or more non-monetary virtual rewards that are part of the game and that are usable by the user as part of the playing of the game.

23. The computing system of claim 20 wherein the facilitating of the performance of the tasks further includes distributing at least some of the monetary compensation to an entity who provides the interactive content to the provider system.

24. The computing system of claim 20 wherein the provider system is further configured to provide the interactive content to the one or more users and to provide the interactive content to one or more additional users, the providing of the interactive content to the one or more additional users being performed without providing information about tasks to be performed to the one or more additional users and including presenting advertisements to the one or more additional users, and the providing of the interactive content to the one or more users being performed without presenting advertisements to the one or more users based at least in part on the monetary compensation to be received by the provider system for the performance of the multiple tasks by the one or more users.

25. The computing system of claim 20 wherein the multiple tasks are submitted to the task fulfillment system by one or more task providers and are available to be performed via the task fulfillment system by humans in exchange for a specified monetary amount from the one or more task providers, and wherein the facilitating of the performance of the tasks further includes receiving the monetary compensation for the performance of the multiple tasks, the received monetary compensation being from the one or more task providers and being based on the specified monetary amount.

26. The computing system of claim 20 wherein the provider system includes software instructions for execution by the one or more processors of the computing system.

27. The computing system of claim 20 wherein the provider system consists of one or more means for the facilitating of the performance of tasks by users of provided interactive content.

* * * * *

UNITED STATES PATENT AND TRADEMARK OFFICE
CERTIFICATE OF CORRECTION

| | | |
|---|---|---|
| PATENT NO. | : 8,961,315 B1 | Page 1 of 1 |
| APPLICATION NO. | : 13/171129 | |
| DATED | : February 24, 2015 | |
| INVENTOR(S) | : Eden G. Adogla | |

It is certified that error appears in the above-identified patent and that said Letters Patent is hereby corrected as shown below:

In the Claims

Column 22, Line 32:
"the providing of the non-monetary rewards includes enabling" should read, --the providing of the non-monetary reward includes enabling--.

Signed and Sealed this
Twenty-third Day of June, 2015

Michelle K. Lee
*Director of the United States Patent and Trademark Office*